(12) United States Patent
Wray et al.

(10) Patent No.: US 9,329,904 B2
(45) Date of Patent: May 3, 2016

(54) PREDICTIVE TWO-DIMENSIONAL AUTOSCALING

(71) Applicant: Tier 3, Inc., Bellevue, WA (US)

(72) Inventors: Jared Eugene Wray, Bothell, WA (US); Shantanu Roy, Coeur d'Alene, ID (US); Kelly Eric Malloy, West Jordan, UT (US); Christian Philip Blakely, Renton, WA (US)

(73) Assignee: Tier 3, Inc., Bellevue, WA (US)

( * ) Notice: Subject to any disclaimer, the term of this patent is extended or adjusted under 35 U.S.C. 154(b) by 259 days.

(21) Appl. No.: 13/645,073

(22) Filed: Oct. 4, 2012

(65) Prior Publication Data

US 2013/0086273 A1  Apr. 4, 2013

Related U.S. Application Data

(60) Provisional application No. 61/543,269, filed on Oct. 4, 2011.

(51) Int. Cl.
*G06F 15/173* (2006.01)
*G06F 9/50* (2006.01)

(52) U.S. Cl.
CPC .................................. *G06F 9/5072* (2013.01)

(58) Field of Classification Search
None
See application file for complete search history.

(56) References Cited

U.S. PATENT DOCUMENTS

| | | | |
|---|---|---|---|
| 2005/0102674 A1* | 5/2005 | Tameshige et al. | 718/100 |
| 2007/0074208 A1 | 3/2007 | Ling et al. | |
| 2009/0037680 A1 | 2/2009 | Colbert et al. | |
| 2009/0116389 A1 | 5/2009 | Ji et al. | |
| 2010/0082321 A1* | 4/2010 | Cherkasova et al. | 703/22 |
| 2010/0083248 A1 | 4/2010 | Wood et al. | |
| 2010/0191845 A1 | 7/2010 | Ginzton | |
| 2010/0250748 A1 | 9/2010 | Sivasubramanian et al. | |
| 2010/0306767 A1 | 12/2010 | Dehaan | |
| 2010/0325197 A1 | 12/2010 | Heim | |
| 2011/0078303 A1 | 3/2011 | Li et al. | |
| 2011/0142064 A1* | 6/2011 | Dubal et al. | 370/412 |
| 2011/0145153 A1* | 6/2011 | Dawson et al. | 705/80 |
| 2011/0225017 A1 | 9/2011 | Radhakrishnan | |

(Continued)

OTHER PUBLICATIONS

International Search Report and Written Opinion for International Application No. PCT/US2013/031026 mailed Jun. 3, 2013.

(Continued)

*Primary Examiner* — Chris Parry
*Assistant Examiner* — Stephen Houlihan
(74) *Attorney, Agent, or Firm* — John W. Branch; Lowe Graham Jones PLLC

(57) ABSTRACT

Embodiments may enable cloud based computing infrastructure to automatically scale in response to changing service demands. Auto-scaling may be enabled by automatically provisioning computing resources as they may be needed by hosted computing services. Historical utilization patterns may be tracked enabling the generation of models that may be employed to predict future computing resource requirements. The automatic scaling system may comprise one or more models that may be trainable using business rules that may be applied to determine to if and how computing resources are scaled. Further, business rules may be arranged to determine provisioning and scaling of computing resources based in part on the historical usage patterns of the computing services.

21 Claims, 14 Drawing Sheets

(56) References Cited

U.S. PATENT DOCUMENTS

2011/0258621 A1 10/2011 Kern
2011/0295999 A1* 12/2011 Ferris et al. .................. 709/224
2012/0066371 A1* 3/2012 Patel et al. .................. 709/224
2012/0131594 A1* 5/2012 Morgan ........................ 718/105
2012/0173709 A1 7/2012 Li et al.

OTHER PUBLICATIONS

International Search Report and Written Opinion for International Application No. PCT/US2013/031046 mailed May 30, 2013.
International Search Report and Written Opinion for International Application No. PCT/US2012/058776 mailed Mar. 26, 2013.

* cited by examiner

*FIG. 10*

PREDICTIVE TWO-DIMENSIONAL AUTOSCALING

CROSS-REFERENCE TO RELATED APPLICATION(S)

This application is a utility patent application based on previously filed U.S. Provisional Patent Application, Ser. No. 61/543,269 filed on Oct. 4, 2011, the benefit of which is hereby claimed under 35 U.S.C, §119(e) and incorporated herein by reference.

TECHNICAL FIELD

Embodiments relate generally to managing computing resources made available to applications and processes executing in enterprise cloud based environments.

BACKGROUND

Applications and processes executing in enterprise cloud based environments may be hindered because of a lack of flexible proactive resource scaling. In many situations, applications and processes executing in cloud based computing environments may have to adapt to varying computing resource requirements based on work load and business purposes. Scaling computing resources at the same time usage demand increases may be insufficient because the demand is already occurring before additional resources have been provisioned. Consequently, the provisioning steps required to accommodate the increased usage demands may impact the quality of service or even require a service interruption to complete the provisioning. Service providers may be a choice between expensive over-provisioning of computing resources and reactively scaling computing resources when demand increases occur. It is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein:

FIG. 10 shows a diagram illustrating a user-interface in accordance with at least one of the various embodiments;

DETAILED DESCRIPTION OF THE EMBODIMENTS

Figure 1:
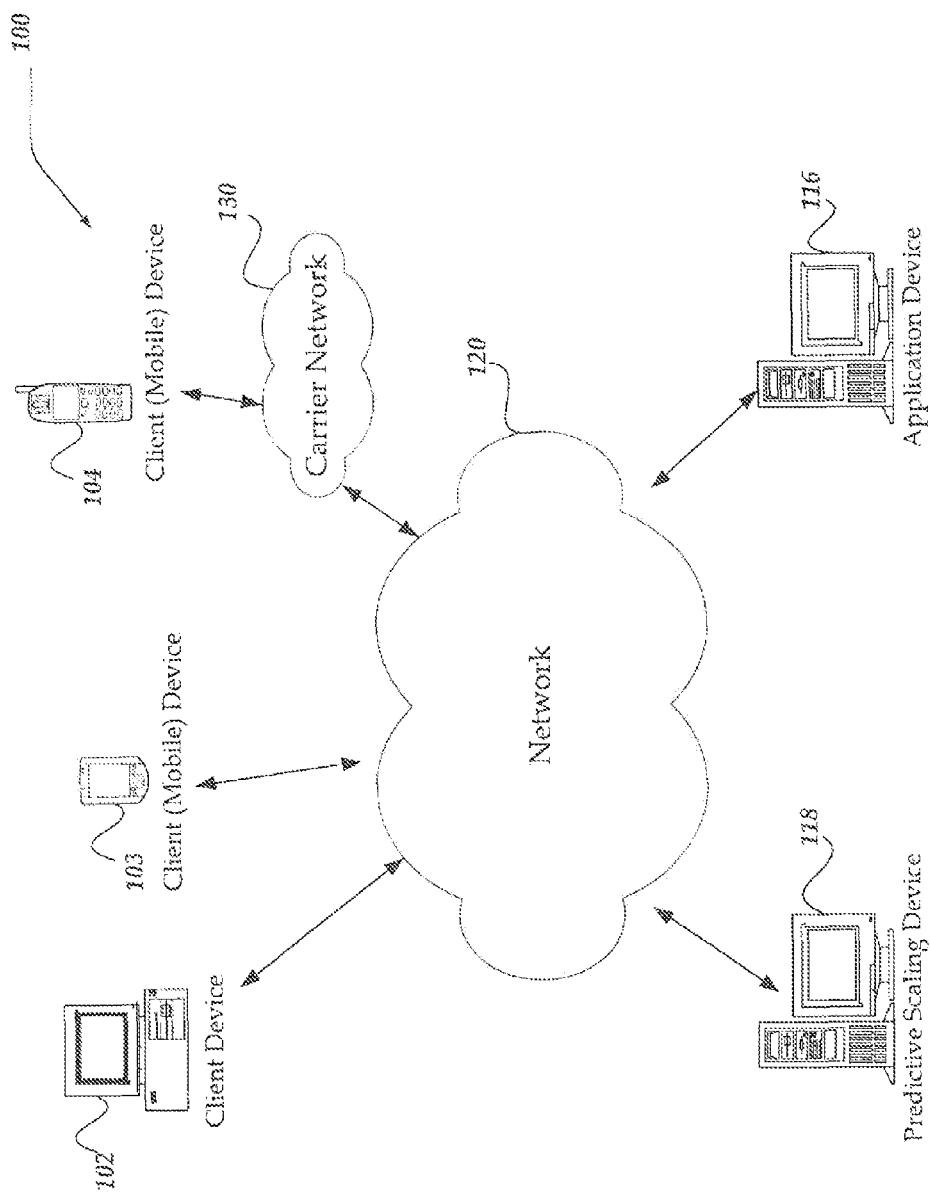
FIG. 1 illustrates an overview of a system in which various embodiments may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and the include plural references. The meaning of "in" includes "in" and "on."

As used herein "computing services" refers to computer based applications and services owned or managed by a user. Computing services may include cloud-based applications that offer a service, application, for external or internal use. In at least one of the various embodiments, computing services may make extensive use of virtualization.

Computing services may comprise one or more applications and/or services offered for internal or external consumption. For example, an "online banking service" computing service may include many application and services operating in conjunction to provide online banking services for consumers. Also, a computing service may comprise a single application such as a web server. In some cases, computing services may be hosted and/or located in remote data centers accessible by users over a network, such as the Internet.

As used herein "computing resources" refers to virtual and physical computing resources necessary to enable a computer service to operate, such as, CPU cycles, Memory, storage devices, network bandwidth, or the like. Generally, computing resources include the hardware and software resources for running computing services. Computing resources may be identified in terms of varying levels of detail. For example, a computing resource may be a complex device such as a physical server and/or network device. In other cases, a computing resource may be broken down into smaller components such as memory, network ports, CPU cores, or the like. In at least one of the various embodiments, computing resources may be virtualized resources such as operating system instances, CPU slices, virtualized peripherals (e.g., virtual network interfaces), or the like. In at least one of the various embodiments, increasing the allocation of computing resources to a computing service provides that computing service additional, resources to use for performing tasks.

As used herein the term "business rule" refers to rules and/or instructions that may be used to either to scale-up or scale-out the allocation computing resources to computing services. Business rules may be based on a variety of factors and/or metrics, including, policy, time, thresholds, or the like. Further, business rules may be customized using a combination of policy, time and threshold to define the aggressiveness of the scaling.

In some cases, business rules may be also bounded by the size of the environment. In this case, a business rule may be constrained by virtual or physical limitations of the computing environment the computer services may be hosted on.

As used herein the terms "scaling, or "auto-scaling" refer to automatically scaling by increasing or decreasing the allocation of one or more computing resources to one or more computing services. Automatic scaling may be applied in combination or singly to a variety of types and/or classes of computing resources, including but not limited to, CPU cycles, I/O (Input/Output) devices, number of threads/processes, available memory, available disk space, network bandwidth, number of virtual machines, number of physical machines, or the like. A predictive sealing application may be employed to proactively auto-scale the computer resources for a computer service.

As used herein the term "horizontal scaling" refers to scaling the allocation of computing resources by increase or decreasing the computer resources by adding or decreasing the number of servers dedicated to a given computing service.

At used herein the term "vertical scaling" refers to scaling the allocation of computing resources by increasing or decreasing computing resources allocated to one or more servers rather than increasing the number of servers. For example, in at least one of the various embodiments, vertically scaling memory for a computing service may include adding memory to the server(s) that host the computing service. In contrast, horizontally scaling may include adding servers to the support the computing service.

As used herein the term "operational data" refers to data the indicate the usage and/utilization of one or more portions of computing resources, the may include various network devices, network device components (CPU, memory, disk drive), software programs, networks, or the like. Operational data may be collected by direct monitoring of logging and feeds from servers or hypervisors, provided by third-party agents that may be installed on a monitored computing resource, collected using advanced monitoring techniques external to the computing resources being monitored.

As used herein the term "predictive usage data" refers to data used for predicting changes in the usage of one or more computer resources. This data may be generated based on operational data collected from computing resources, servers, network devices, or the like. The collected data may be processed using predictive processes such as linear regression, CHi-squared Automatic Interaction Detection (CHAID), or the like. Such modeling may produce predictive usage data for modeling future trends in the usage of the particular computing resources that may be monitored.

As used herein the term "current usage data" refers usage data generated based on operational data collected from computing resources, servers, network devices, or the like. In at least one of the various embodiments, current usage data represents the current usage data for one or more computing resources. The current usage data may be used in models for predicting the future usage of computing resources.

Briefly stated, at least one of the various embodiments may enable enterprise cloud based computing infrastructure to automatically scale in response to changing service demands. In at least one of the various embodiments, auto-scaling may be enabled by automatically provisioning computing resources as they may be needed by hosted computing services. In at least one of the various embodiments, historical utilization patterns may be tracked enabling the generation of models that may be employed to predict future computing resource requirements. Predicting demand in advance may enable provisioning of computing resources to meet the predicted demand in advance of the demand. In at least one of the various embodiments, this kind of proactive/planned provisioning of computing resources for predicted demand may avoid reactive computing resource provisioning to respond changing demand. In at least one of the various embodiments, the automatic sealing system may comprise one or more models that may be trainable using business rules that may be applied to determine to if and how computing resources are scaled. Further, business rules may be arranged to determine provisioning and scaling of computing resources based in part on the historical usage patterns of the computing services.

In at least one of the various embodiments, a predictive scaling application may gather and arrange performance characteristics and/or usage data on a daily, weekly, quarterly, bi-yearly, or yearly basis. In at least one of the various embodiments, the predictive scaling application may use heuristics and predictive algorithms to determine a sealing strategy based on gathered usage data.

In at least one of the various embodiments, auto-scaling of computing resources may be enabled by the application of one or more formulas to one or more usage components. In at least one of the various embodiments, such formulas may be multiplicative, logarithmic, exponential, or the like. Also, formulas may be applied to one or more components of the monitored computing resources such as, CPU utilization, resident memory (RAM), block device storage (e.g., hard disks), storage device latency, memory paging, number of disk writes, block device I/O demands, or the like. In at least one of the various embodiments, these formulas may include using one or more well-known methods such as, Chi-squared Automatic Interaction Detectors (CHAID), for comparing and/or detecting the interactions the various monitored computing components have on each other.

In at least one of the various embodiments, auto-scaling may operate in multiple "dimensions," such as horizontal scaling, vertical scaling, or the like.

In at least one of the various embodiments, horizontal scaling may also be known as "scaling out" to add more physical and/or virtual servers to a hosted computing service's current allocation of computing resources. In at least one of the various embodiments, a predictive scaling application may automatically determine a range (e.g., lower bound and upper bound) for computing resources available to a computing service based on the historical computing resource requirements for the same or similar computing services. In at least one of the various embodiments, automatically determined ranges may be modified and/or overridden using values that may be determined from configuration files, manually entered by an user, set using an API, or the like.

In at least one of the various embodiments, vertical scaling may be enabled by adding computing resources to existing physical or virtual servers that may be previously allocated or assigned to a hosted computing service. Further, in at least one of the various embodiments, computing resources such as CPUs (e.g., CPU cycles, virtual CPUs, physical CPUs, or the like), memory, block device storage, block device IO, or the like, may be determined by vertical scaling. In some embodiments, vertical scaling may also be known as "scaling-up." Generally, scaling-up implies computing resources may be added to the physical or virtual servers hosting a computing service rather adding more physical or virtual servers for hosting a computing service.

In at least one of the various embodiments, a user may determine a risk threshold that may correspond how their hosted computing services may respond to dynamic auto-sealing of computing resources. For example, if a user's computing service is not designed to adapt to auto-sealing of computing resources the may set a low value for the computing service's risk threshold.

In at least one of the various embodiments, computing services having low risk thresholds may have a low tolerance to variations in computing resources. For example, in at least one of the various embodiments, a computing service having a low risk threshold may be one that may incur a system/service interruption (e.g., restart) if it is subject to auto-scaling. Accordingly, computing services having low risk thresholds may require scaling and computing resources provisioning to occur during planned time periods, such as, during a planned maintenance period.

On the other hand, in at least one of the various embodiments, computing services that may have a high risk threshold may be more tolerant of auto-scaling. For example, in at least one of the various embodiments, a computing service with a high risk threshold may have computing resources scaled without interrupting the service.

In at least one of the various embodiments, users may employ the predictive scaling application to predefine ranges that establish lower and upper bounds of computing resources to be allocated to a given computing service. These ranges may provide predictability in managing costs. In other cases, in at least one of the various embodiments, uses may enable a predicative scaling application to automatically scale computing resources based on usage demands.

In some of the various embodiments, fees and costs associated with the hosting and/or operation of computing services may be calculated based on the amount of computing resources used by the computing services. In at least one of the various embodiments, enabling users to determine the upper and lower bounds of scaling ranges may enable users to manage the fees and costs associated with operating their computing services.

In at least one of the various embodiments, horizontal scaling and vertical scaling of hosted applications may be based in part on predefined business rules. In at least one of the various embodiments, these business rules may be provided to the system using a user interface, a configuration file, loaded from a remote location by way of API, or the like. Also, in at least one of the various embodiments, business rules may be expressed in various computer languages including, but not limited to, C, C++, C#, Java, SQL, Perl, Python, Ruby, JavaScript, Extensible Markup Language (XML), JavaScript Object Notation (JSON), or the like.

In at least one or the various embodiments, the predictive sealing application may enable auto-scaling to use predefined business rules based on policy guidelines. For these rules, in at least one of the various embodiments, scaling and provisioning of computing resources may be determined based on policy guidelines that may include, restricting computing resources for services that may be deemed less important than other services, providing auto-scaling without upper bounds for services deemed critical, or the like. In general, in at least one of the various embodiments, policy based business rules may be directed at adaptively scaling and provisioning computing resources to match needs of the users independent of actual and/or instant usage demand of the computing services.

In at least one of the various embodiments, other predefined business rules may be configured to auto-scale computing resources based on the date, day, month, time of day, or the like. In at least one of the various embodiments, such business rules may be arranged to scale and provision computing resources more aggressively during time periods when a computing service may be expected to be more active. Further, in at least one of the various embodiments, a predefined business rule may be arranged to increase a computing service's allocation of computing resources during time periods that may cost less, such as, weekends, or late evening.

In at least one of the various embodiments, predefined business rules may be organized into parts based on predetermined thresholds that may correspond to the utilization level of one or more computing resources. In at least one of the various embodiments, each part of the business rule may come into force if other conditions may be met (e.g., if utilization of a particular computing resource reaches a certain level). For example, in at least one of the various embodiments, a business rule may be defined such that if CPU utilization remains within 20%-60% a standard predictive scaling formula may be employed, but if CPU utilization goes above 60% then a more aggressive predictive scaling formula may be employed until the CPU utilization returns to below 60% for a defined period of time. One of ordinary skill in the art will appreciate that there may be many other computing resources, performance characteristics, or the like, that may that may comprise conditions (e.g., thresholds) that correspond to a portion/part of a business rule. And that meeting such a condition (e.g., reaching or passing a threshold) may trigger different behaviors depending on the particular business rule, or part of a business rule, that may correspond to the threshold value.

In at least one of the various embodiments, predefined business rules may be customized with a combination of policy, time, or risk thresholds that may in part determine the aggressiveness of the auto-scaling employed by the predictive scaling application.

In at least one of the various embodiments, predefined business rules may comprise elements and/or expressions that may based on and/or correspond to properties of the computing environment where the a computing service may be operative, such as, operating system properties, hypervisor properties, hardware properties, or the like). For example, in at least one of the various embodiments, a computing services may be operative on one or more virtual instances of an operating system that may have defined maximum or minimum limits for various computing resources, such as, as maximum number of CPU, maximum/minimum memory, or the like. In at least one of the various embodiments, the predictive sealing application may enable business rules recognize and take into account such properties inherent in the customers operating environment.

In at least one of the various embodiments, a scaling suggestion engine may use heuristics to determine a recommended scaling path based on a combination of business rules and usage history.

Illustrative Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client device(s) 102, mobile (client) devices 103-104, network 120, carrier network 130, one or more predictive scaling devices 118. Network 120 is in communication with and enables communication between each of the elements of system 100. Carrier network 130 further enables telephonic communication with wireless communication devices such as mobile device 104. Also, system 100 includes one or more application devices 116.

Client devices 102-104 may include virtually any computing device capable of receiving and sending a message over a network, and/or to and from another computing device. The set of such client devices may include devices that typically connect to a network using a wired communications medium such as personal computers, tablet computers, multiprocessor systems, microprocessor-based or programmable consumer electronics, network PCs, or the like. Further, client devices 102-104 may include any mobile device that is also, or instead, capable of connecting to a network via a wireless communication signal such as a personal digital assistant (PDA), pocket PC, wearable computer, portable computing device, tablet computing device, mobile computing device, cell phones, smart phones, pagers, walkie talkies, radio frequency (RF) devices infrared (IR) devices, citizen band (CB) radio devices, or any other device that is equipped to communicate over a wireless communication medium. Client devices may also include integrated devices combining one or more of the preceding devices and/or elements of one or more of these devices.

Each client device within client devices 102-104 may include a browser application that is configured to send, receive, and display web pages, or the like. The browser application may be configured to receive and display graphics, text, multimedia, or the like, employing virtually any web based language, including, but not limited to Standard Generalized Markup Language (SMGL), such as Hyper Text Markup Language (HTML), extensible markup language (XML), a Handheld Device Markup Language (HDML), such as Wireless Markup Language (WML), WMLScript, JavaScript, or the like. Client devices 102-104 may further include a messaging application configured to send and/or receive a message to/from another computing device employing another mechanism, including, but not limited to instant messaging (IM), email, Short Message Service (SMS). Multimedia Message Service (MMS), internet relay chat (IRC), jabber, or the like. Client devices 102-104 may further include a voice over IP (VOIP) application that enables voice communication over network 120 separate from carrier network 130.

Network 120 is configured to couple one computing device to another computing device, enabling them to communicate. Network 120 is enabled to employ any form of medium for communicating information from one electronic device to another. Also network 120 may include a wireless interface, and/or a wired interface, such as the Internet, Cloud Computing, or the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), wide code division multiple access (WCDMA), high speed downlink packet access (HSDPA), long term evolution (LTE), ultra wide band (UWB), IEEE 802.16 Worldwide interoperability for Microwave Access (WiMax), Wi-Fi IEEE 802.11, or the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Carrier network 130 may include wireless interfaces, wireless forms of communication, and/or wireless links such as cellular networks, satellite links, Infra-Red, Micro-Wave links, Open Air Laser links, or the like. These wireless links may include various mobile communication protocols such as wireless application protocol (WAP), global system for mobile communications (GSM), code division multiple access (CDMA), wide code division multiple access (WCDMA), long term evolution (LTE), high speed downlink packet access (HSDPA), time division multiple access (TDMA), general packet radio service (GPRS), ultra wide band (UWB), IEEE 802.16 Worldwide Interoperability for Microwave Access (WiMax), Wi-Fi IEEE 802.11, or the like.

The communication media used to transmit information in mobile communication links as described above may generally include arty communication media that is processor readable by a computing device. Such media may include any processor readable non-transitory storage media. Processor readable media may also include transitory wired and/or wireless communication media, or any combination thereof. Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, or the like. By way of example, communication media includes wireless media such as fluids or space for acoustic, RF, microwave, infrared, free space laser, and other wireless signals, and wired media such as twisted pair, coaxial cable, fiber optics, wave guides, and other wired media.

Predictive Scaling Device(s) 118 and Application Device(s) 116 may comprise multiple computing devices, components of a single computing device, or a single device with multiple software features. In some embodiments, Predictive Scaling Device(s) 118 and/or Application Device(s) may comprise a cluster of network devices, such that functionality is shared among the network devices of the cluster in a load-balanced and/or parallel processing. In some embodiments, system 100 may include load balancers (not shown) or other network devices that manage the load balancing of tasks among Predictive Scaling Device(s) 118 and/or Application Device(s) respectively.

In some embodiments, Predictive Scaling Device(s) 118 and Application Device(s) 116 may use external data storage for storing data. The stored data may include web sites, databases, log files, online journals (e.g., blogs), photos, reviews, and information regarding online services such as messaging, search, news, shopping, advertising, travel services, or virtually any other type of data. Additionally, in some embodiments, a user of client devices 102-104 may access data and application(s) installed on Predictive Scaling Device(s) 118 and Application Device(s) 116.

Figure 2:
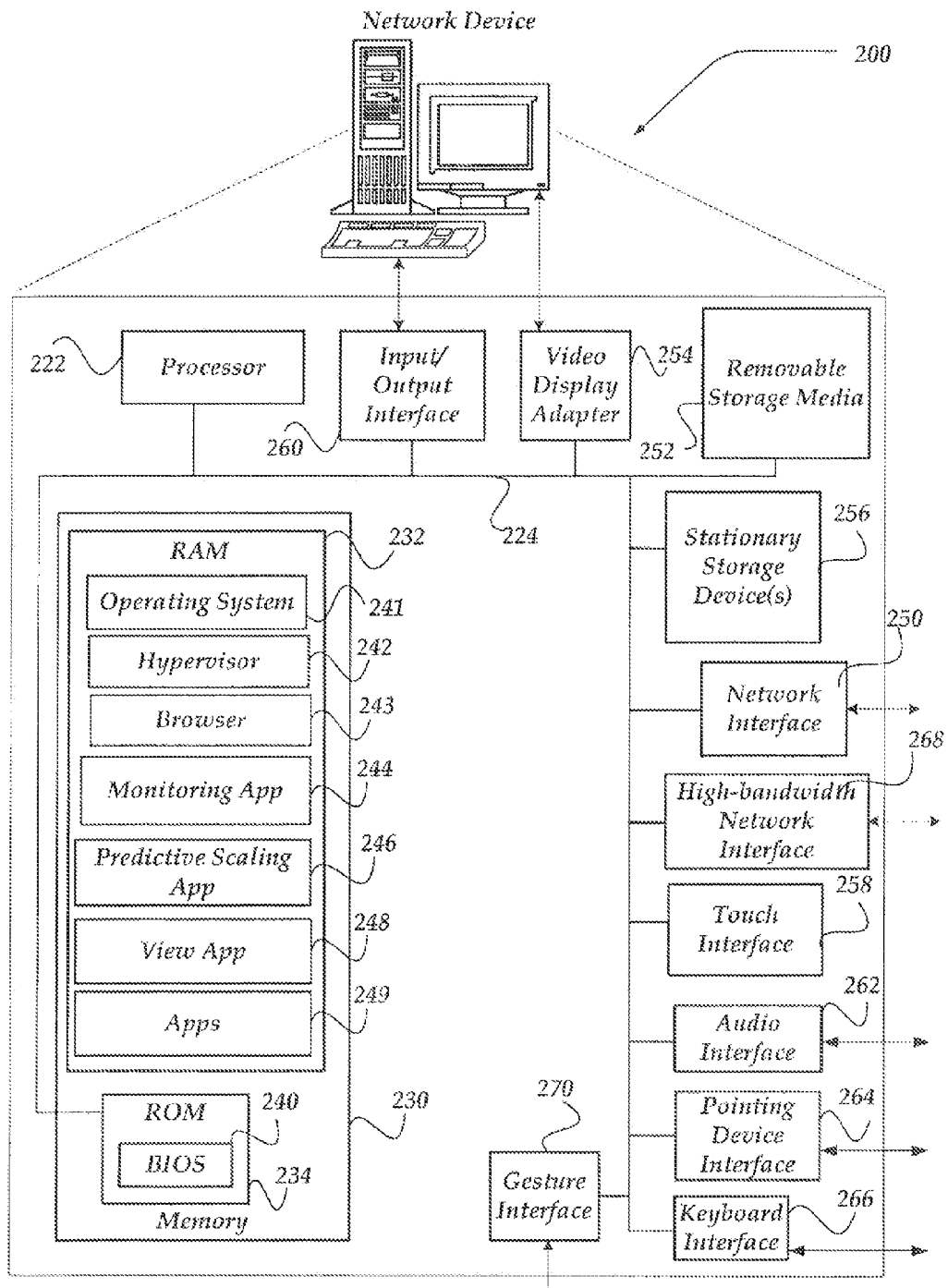
FIG. 2 shows a network device that may be arranged as a predictive scaling server in accordance with at least one of the various embodiments.

FIG. 2 shows one embodiment of a network device, according to at least one of the embodiments. Network device 200 may include many more, or fewer, components than those shown. The components shown, however, are sufficient to disclose an illustrative embodiment. Network device 200 may represent, for example, Predictive Scaling Device 118 and Application Device 16 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Apple Mac OS®, Microsoft Windows®, UNIX, or LINUX®, or a specialized mobile communication operating system such as Apple iOS®, Google Android, Microsoft Windows Mobile™, the Symbian® operating system, or the like. The operating system may include, or interface with a Java® virtual machine module that enables control of hardware components and/or operating system operations via Java application programs.

Memory 230 can be utilized by network device 200 to store programs, applications, software modules, or the like, as well as the data used by such programs, applications, and/or software modules. Applications may comprise processor executable instructions which can be executed by network device 200. Programs in mass memory 230 may include a browser application 243. Browser 243 may run under the control of operating system 241 to transmit, receive, render, and/or otherwise process documents of various formats (e.g. PDF, Word, Excel, or the like), markup pages such as HTML pages, XML pages, WAP pages (sometimes referred to as WAP cards), or the like, and/or multimedia content (e,g audio, video, graphics), and any other form of content deliverable over the web. Mass memory 230 may also include one or more View applications 248, and Monitoring applications 244. Memory 230 may further include a Hypervisor 242 and Predictive Scaling application 246. Also, additional applications 249 may be included, such as, data collections, customer processes, or the like.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 243, and/or programs in memory 230, interaction with the user interface includes visual interaction via a display coupled to video display adapter 254. The user interface can also include gesture interface 270, touch interface 258, pointing device interface 264, keyboard interface 266, and audio interface 262.

Network device 200 may include removable storage media 252 and stationary storage device(s) 256. Removable storage media 252 can comprise one or more of an optical disc drive, flash, memory drive, hard drive, a floppy disk drive, tape drive, and/or any other type of processor readable non-transitory storage media. Stationary storage device 256 or removable storage media 252 may include any method or technology for processor readable non-volatile storage of data such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 250, network device 200 can communicate with a communication protocol, such as Ethernet or the like, with a wide area network such as the Internet, Cloud Network, a local area network, a wired telephone network, a cellular telephone network, or sumac other communications network, such as networks 120 and/or carrier network 130 in FIG. 1. Additionally, high bandwidth network interface 268 is provided to enable network device 200 to communicate with other co-located network devices at vastly greater speeds than network interface 250. For example, network device 200 may be physically embodied on a "blade" or card in a chassis that supports the operation of several co-located blades and provides access to a high bandwidth network backplane for the network devices to communicate particular information between each other over high bandwidth network interface 268.

Generalized Operation

Figure 3:
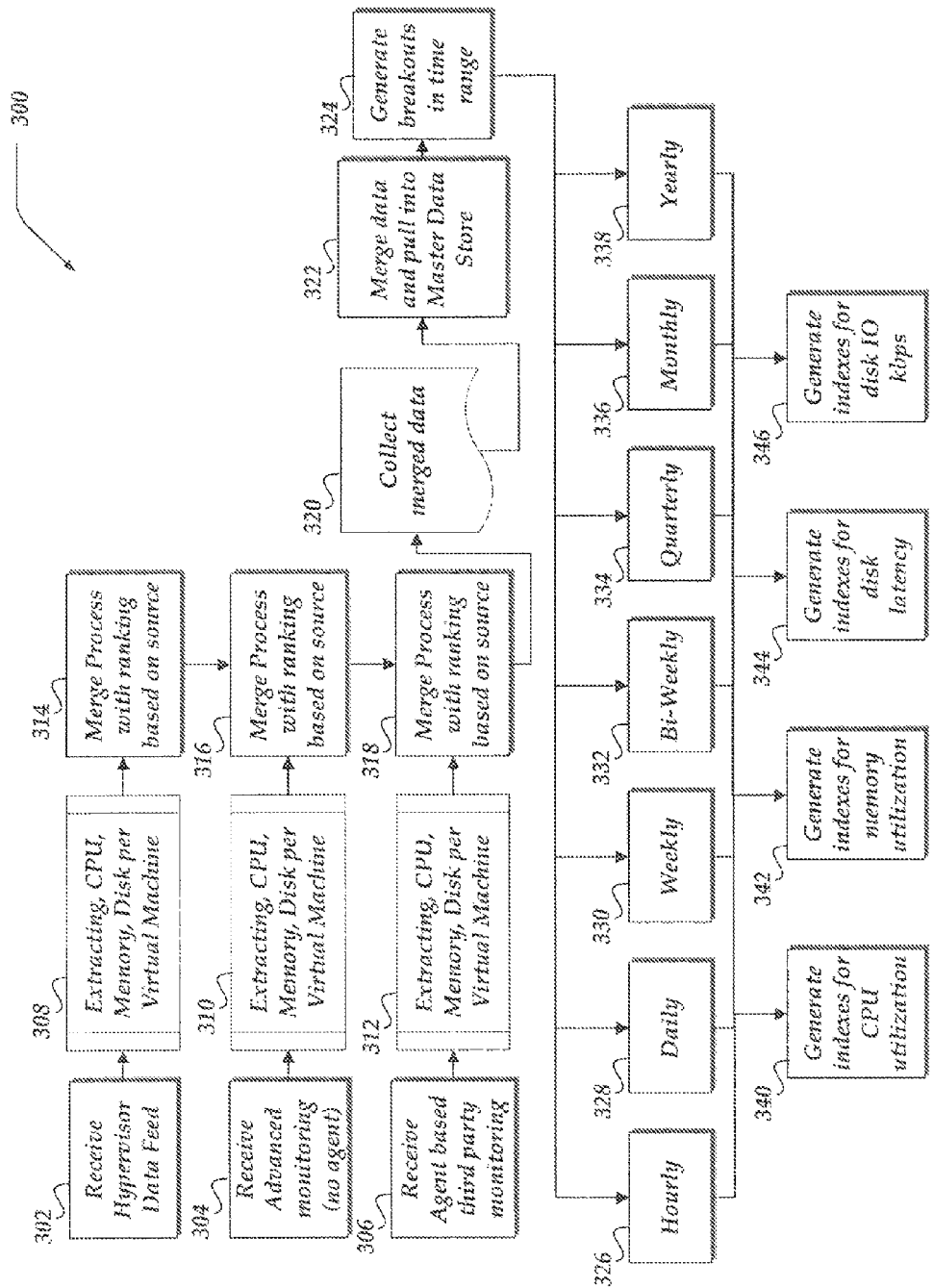
FIG. 3 shows a logical overview for a process for data gathering in accordance with at least one of the various embodiments.

FIG. 3 shows a logical flow diagram for process 300 for data gathering in accordance with at least one of the various embodiments.

In at least one of the various embodiments, predictive scaling application 246 may include a predictive engine that makes determinations based on the performance and usage data that may be gathered from the various components of the cloud based infrastructure, such as, hypervisors, historical usage data, customer preferences, or the like. In at least one of the various embodiments, the gathered data for predicting computing resource needs may be compiled into indexes and time-delineated data collections.

At block 302, in at least one of the various embodiments, one or more hypervisors may send data using hypervisor data feeds which may be one of the sources for data that may be used to create the indexes. In at least one of the various embodiments, a hypervisor data feed may include data relating to hypervisor hosted guest applications.

At block 304, in at least one of the various embodiments, advanced monitoring data may be received relating to hosted processes and applications that may comprise one or more computing services. In at least one of the various embodiments, the advanced monitoring data may be enabled by using additional components that may be added to a hypervisor, such as plugins, or the like.

At block 306, in at least one of the various embodiments, performance characteristics of hosted applications may be monitored and collected by third party monitoring agents. In at least one of the various embodiments, monitoring agents may be programs that execute separate from a hypervisor that may be executing on the same computing device as the hypervisor, or the monitoring agents may be executing on computing devices separate from the hypervisor.

Further, one of ordinary skill in the art will appreciate that there are many other sources where performance characteristics of hosted applications may be acquired and collected beyond those disclosed herein.

At block 308, in at least one of the various embodiments, relevant operational information may be extracted from the hypervisor feed. In at least one of the various embodiments, extracted data may include performance and/or usage information such as, CPU usage, memory, disk storage, disk IO, network IO, memory paging, caching, or the like. One of ordinary skill in the art will appreciate that there may be many other performance characteristics that may be monitored and collected by a hypervisor.

At block 310, in at least one of the various embodiments, relevant operational information may be extracted from the received advance monitoring data feed. In at least one of the various embodiments, extracted data may include performance and/or usage information such as, CPU usage, memory, disk storage, disk IO, network IO, memory paging, caching, or the like. One of ordinary skill in the art will appreciate that there may be many other performance characteristics that may be monitored and collected by an advanced monitoring.

At block 312, in at least one of the various embodiments, relevant operational information may be extracted from the received agent based data feed. In at least one of the various embodiments, extracted data may include performance and/or usage information such as, CPU usage, memory, disk storage, disk IO, network IO, memory paging, caching, or the like. One of ordinary skill in the art will appreciate that there may be many other performance characteristics that may be monitored and collected by way of agent based monitoring.

At blocks 314-318, in at least one of the various embodiments the data received and extracted from the various sources may be maybe merged together. In at least one of the various embodiments, the collected performance characteristics data from each source may be merged together and sorted based on a ranking score that may be determined based in part on the source of the collected data.

In at least one of the various embodiments, if determining how or if to initiate scaling (either sealing-up or scaling-out) the predicative scaling application may consider multiple data sources and business rules. In at least one of the various embodiments, the order in which the business rules may be applied is order based in part on a resultant ranking system. In at least one of the various embodiments, the predictive scaling application may gather data from various sources, such as, hypervisors, agent-less monitoring, agent based monitoring, or the like. In at least one of the various embodiments, the predictive scaling application may gather data related to various operational metrics, including, CPU, Memory, Disk or the like.

In at least one of the various embodiments, the predictive scaling application may merge and/or normalize the gathered data. In at least one of the various embodiments, the merged and/or normalized data may be stored so it may be employed by a ranking system. In at least one of the various embodiments, the predictive sealing application may employ one or more well known normalization techniques, including, but not limited to, deriving means for each type of gathered data using standard deviation.

In at least one of the various embodiments, the predictive scaling application may determine a ranking mechanism for prioritizing the business rules for allocating computing resources may be to computing services. In at least one of the various embodiments, ranking may determined based on historical patterns identified from the gathered data. Also, in at least one of the various embodiments, the predictive scaling application may enable users to rank the business rules that may be applied to their computing services. For example, in at least one of the various embodiments, a user may determine the database server may need or use increase memory and CPU resource when scaled. Thus, the user may rank the business rules for scaling CPU and Memory such that they are sealed together when applied to database server computing services. In at least one of the various embodiments, the ranking value generated by the predictive scaling application may be integers, floating points, percentages, or the like.

At block 320, in at least one of the various embodiments, the merged data from the various data sources may be collected into one or more collections.

At block 322, in at least one of the various embodiments, the collected performance data from the various monitoring sources may be merged and stored into a master data store.

At block 324, in at least one of the various embodiments, the data that is held in the master data store may be organized and characterized based one or more time ranges that may correspond to the received data.

At blocks 326-338, in at least one of the various embodiments, the collected performance characteristics data may be arranged in time periods such as, hourly 326, daily 328, weekly 330, bi-weekly 332, quarterly 334, monthly 336, yearly 338, or the like.

At blocks 340-346, in at least one of the various embodiments, the collected data performance characteristics indexes may be generated for various computing resources, such as, CPU utilization 340, memory utilization 342, disk latency 344, disk IO throughput 346, or the like. In at least one of the various embodiments, the indexed stores of performance characteristics may be used by the predictive engine when determining scaling predictions.

Figure 4:
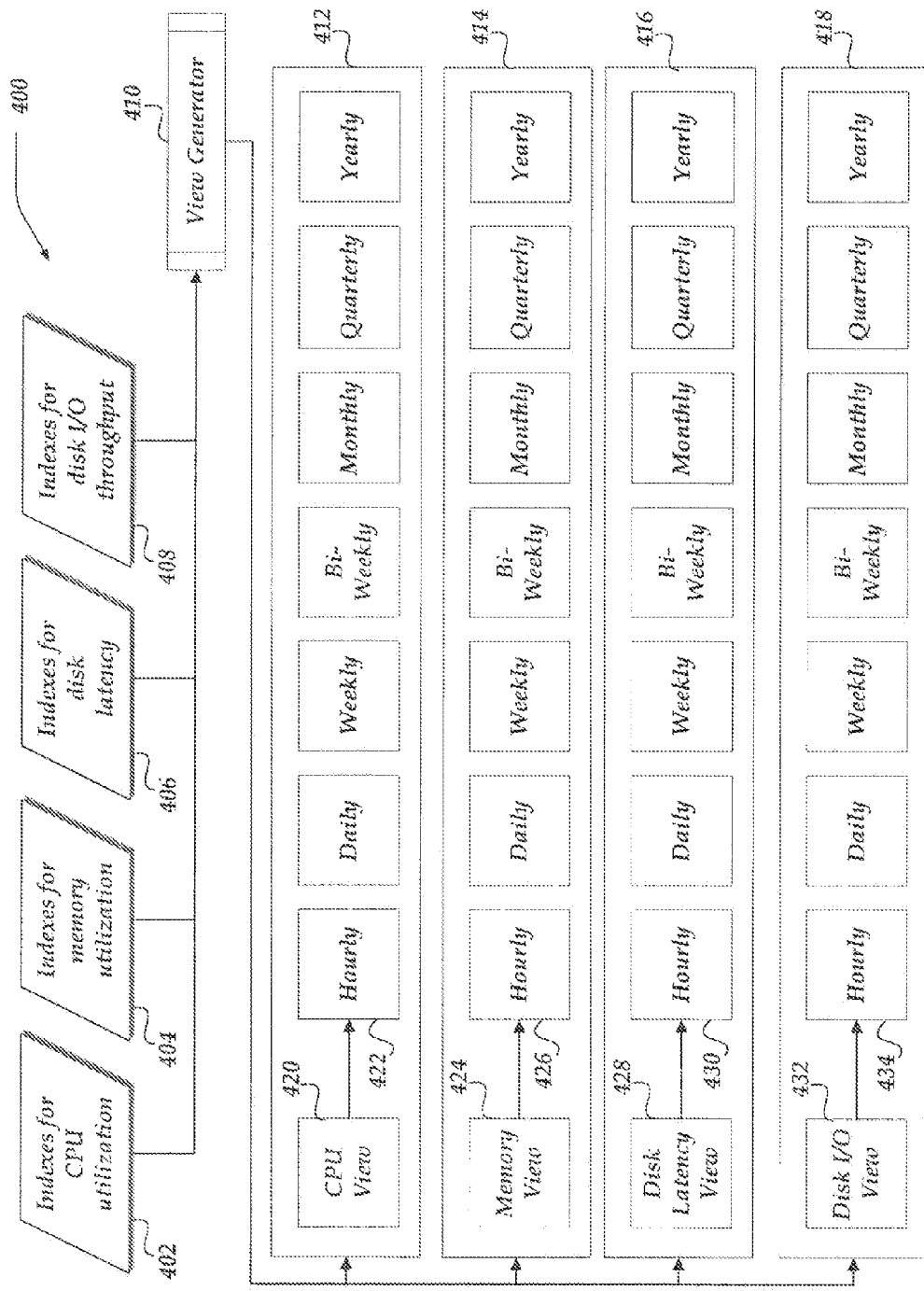
FIG. 4 shows a logical diagram illustrating an overview of a data gathering and view generation system in accordance with at least one of the various embodiments.

FIG. 4 shows a logical diagram illustrating an overview of data gathering and view generation system 400 in accordance with at least one of the various embodiments.

In at least one of the various embodiments, read-only views of the indexed data may be generated so analysis of the indexed performance characteristics data may occur without the disruption that may be caused by the continuously incoming data feeds from the monitoring of the hosted applications. In at least one of the various embodiments, read-only views may be generated for one or more of the monitored computing resources for which performance characteristics and/or metrics have been collected into index, including, but not limited to CPU utilization 402, memory utilization 404, disk latency 406, disk throughput 408.

In at least one of the various embodiments, view generator 410 may retrieve data from the indexes and use it to generate view collections 412-418 with one view collection for each of the monitored computing resources (CPU View 412, Memory View 414, Disk Latency View 416, Disk I/O View 418).

Also, in at least one of the various embodiments, computing resource views may be arranged based on time period and/or time durations including, hourly, daily, weekly, bi-weekly, monthly, quarterly, yearly, or the like.

For example, in at least one of the various embodiments, CPU view 420 may be generated from CPU utilization index 402. In at least one of the various embodiments, CPU view 420 may include views arranged based on time periods 422. In at least one of the various embodiments, Memory view 424 may be generated from Memory utilization index 404. In at least one of the various embodiments, Memory view 424 may include views arranged based on time periods 426. In at least one of the various embodiments, disk latency view 428 may be generated from disk latency index 406. In at least one of the various embodiments, disk latency view 428 may include views arranged based on time periods 430. In at least one of the various embodiments, disk I/O view 432 may be generated from disk I/O index 408. In at least one of the various embodiments, disk I/O view 432 may include views arranged based on time periods 434.

In at least one of the various embodiments, as part of the of the process for generating read-only views of the performance characteristics additional statistical processing may be applied to the collected performance characteristic data, including but not limited to multiple linear regression techniques (e.g., (.hi-square Automatic interaction Detection).

Figure 5:
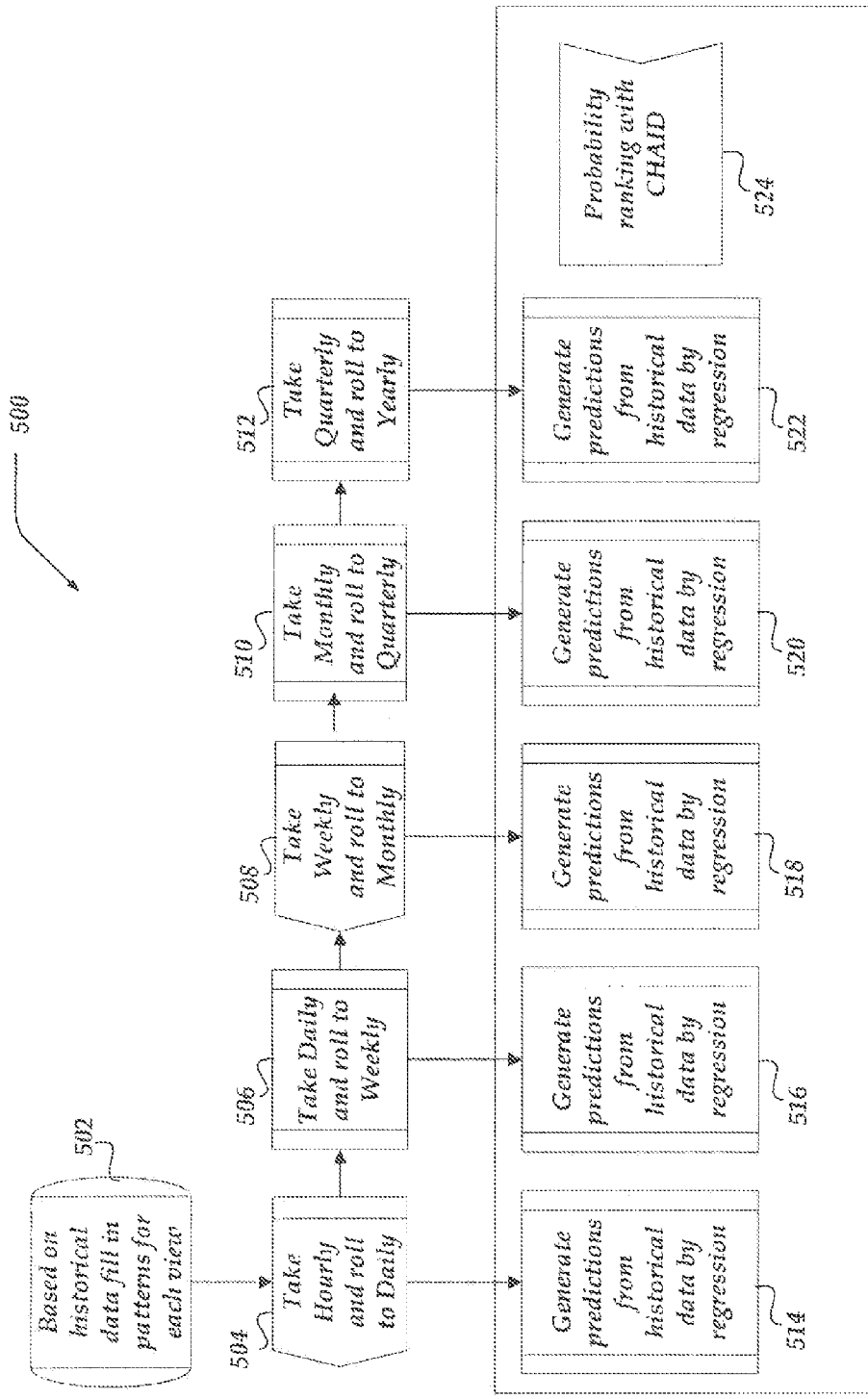
FIG. 5 shows an overview flowchart for a process for generating a historical prediction score in accordance with at least one of the various embodiments.

FIG. 5 shows an overview flowchart for process 500 for generating a historical prediction score in accordance with at least one of the various embodiments. In at least one of the various embodiments, historical prediction scores for one or more performance characteristics may be generated.

At block 502, in at least one of the various embodiments, historical performance characteristic data may be used to generate patterns for each read-only view.

At block 504, in at least one of the various embodiments, the data collected on an hourly basis may be rolled up and aggregated into daily results. At block 506, in at least one of the various embodiments, the daily results may be rolled up into weekly results.

At block 508, in at least one of the various embodiments, the weekly results may be roiled up into monthly results. At block 510, in at least one of the various embodiments, the monthly results may be rolled up into quarterly results. At block 512, in at least one of the various embodiments, the quarterly results may be rolled up into yearly results.

One of ordinary skill in the art will appreciate that collecting and aggregation of collected data is not limited to a particular set of time periods, nor is the aggregation limited to periods of time.

In blocks 514-522, in at least one of the various embodiments, predictions may be generated from historical data by employing regression analysis. In at least one of the various embodiments, data may be collected grouped and quantized in terms of how a resource is utilized, such as data collected into views representing CPU utilizations of 10%, 20%, 30%, or the like. In at least one of the various embodiments, for each of the data collection time bands (e.g., hourly, weekly, daily, monthly, quarterly, yearly) predictions may generated from historical data by performing statistical analysis on the data for each band. In at least one of the various embodiments, may determine a probability ranking for the performance characteristic data bands using Chi-square Automatic Interaction Detection (CHAID) 524.

Figure 6:
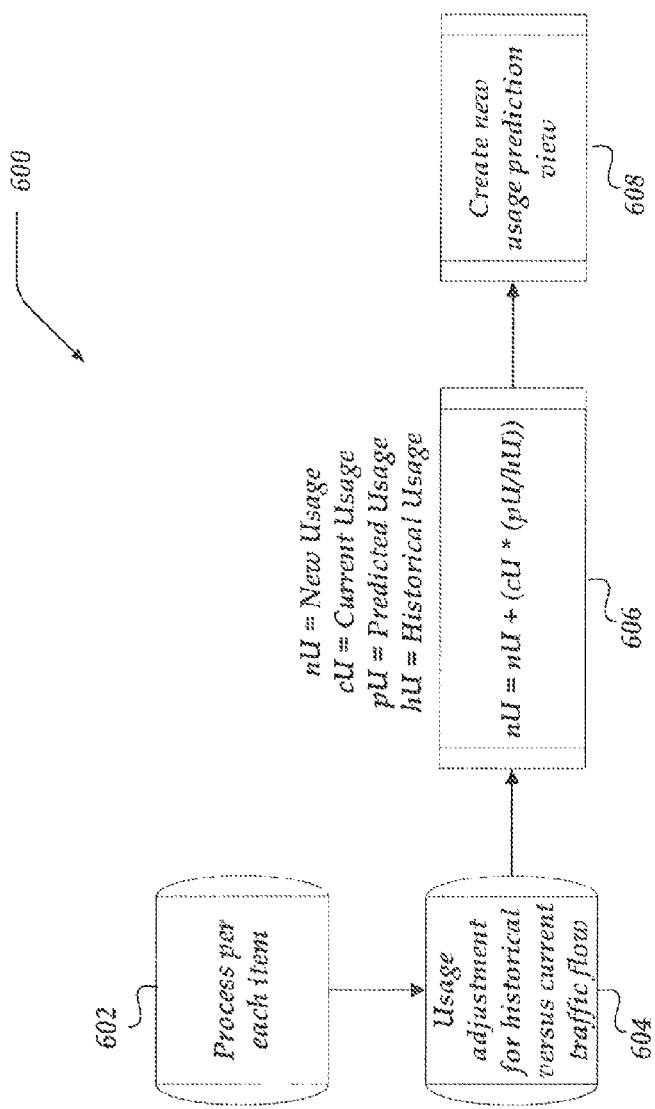
FIG. 6 shows an overview flowchart for a process for generating a prediction score calculation in accordance with at least one of the various embodiments.

FIG. 6 shows an overview flowchart for process 600 for generating a prediction score calculation in accordance with at least one of the various embodiments. In at least one of the various embodiments, a current view and a historical view may be used to determine a prediction score that may be evaluated to determine if a change in computing resources may be required. At block 602, in at least one of the various embodiments, for each monitored computing resource a prediction score calculation determination may be applied to create a new usage prediction view for the computing resource being analyzed.

At block 604, in at least one of the various embodiments, a usage adjustment for historical demand versus current demand may be generated.

At block 606, in at least one of the various embodiments, a usage prediction score calculation may take into account the new usage (nU), current usage (cU), previously predicted usage (pU), and the historical usage (hU) of the computing resource under analysis. In at least one of the various embodiments, these values may be used to calculate a new usage prediction view for the component where:

$$nU=nU+(cU*((pU/hU))$$

At block 608, in at least one of the various embodiments, a new usage demand prediction view may be generated based in part on the results calculated in block 606.

Figure 7:
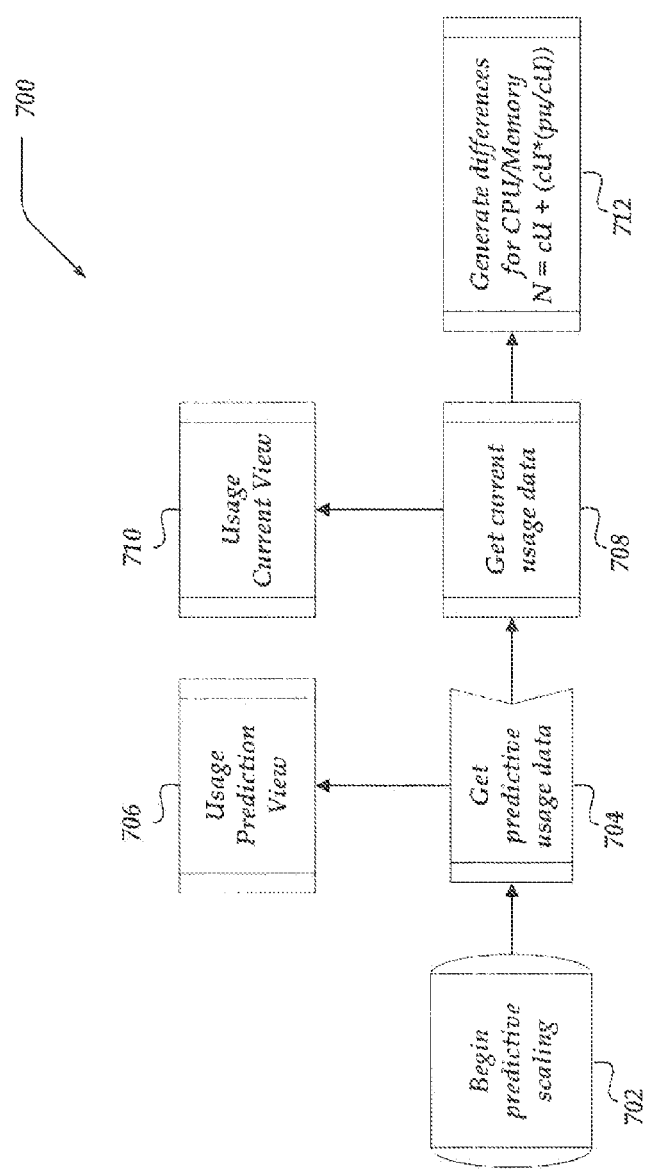
FIG. 7 shows an overview logical flowchart for a process for determining a delta calculation in accordance with at least one of the various embodiments.

FIG. 7 shows an overview logical flowchart for process 700 for determining a delta calculation in accordance with at least one of the various embodiments. Process 700 may be used by at least one of the various embodiments that may be used to determine one or more delta calculations that may indicate that a computer resource may require scaling.

At block 702, in at least one of the various embodiments, a predictive sealing process may be initiated.

At block 704 and block 706, in at least one of the various embodiments, for a given computing resource (e.g., CPU utilization) the process begins by retrieving the predictive usage data for the computing resource under analysis from the appropriate usage prediction view that corresponds to the computing resource under analysis.

At block 708 and 710, in at least one of the various embodiments, the process continues b getting the current usage data for the computing resource under analysis from the usage current view corresponding to the computing resource under analysis.

At block 712, in at least one of the various embodiments, from the collected data the process may determine the differences (N) for the computing resources under analysis. In at least one of the various embodiments, a formula such as; N=(cU+(pU/cU)) maybe applied to determine a value that may correspond to the delta between the predicted usage score and the current usage score for the computing resource that is under analysis. One of ordinary skill in the art will appreciate that other formulas may be used to compute the difference between predicted usage and current usage. Also, in at least one of the various embodiments, the delta calculation formula may be selected from a plurality of available formulas where different computing resources may use different formulas for their respective delta calculation.

Figure 8:
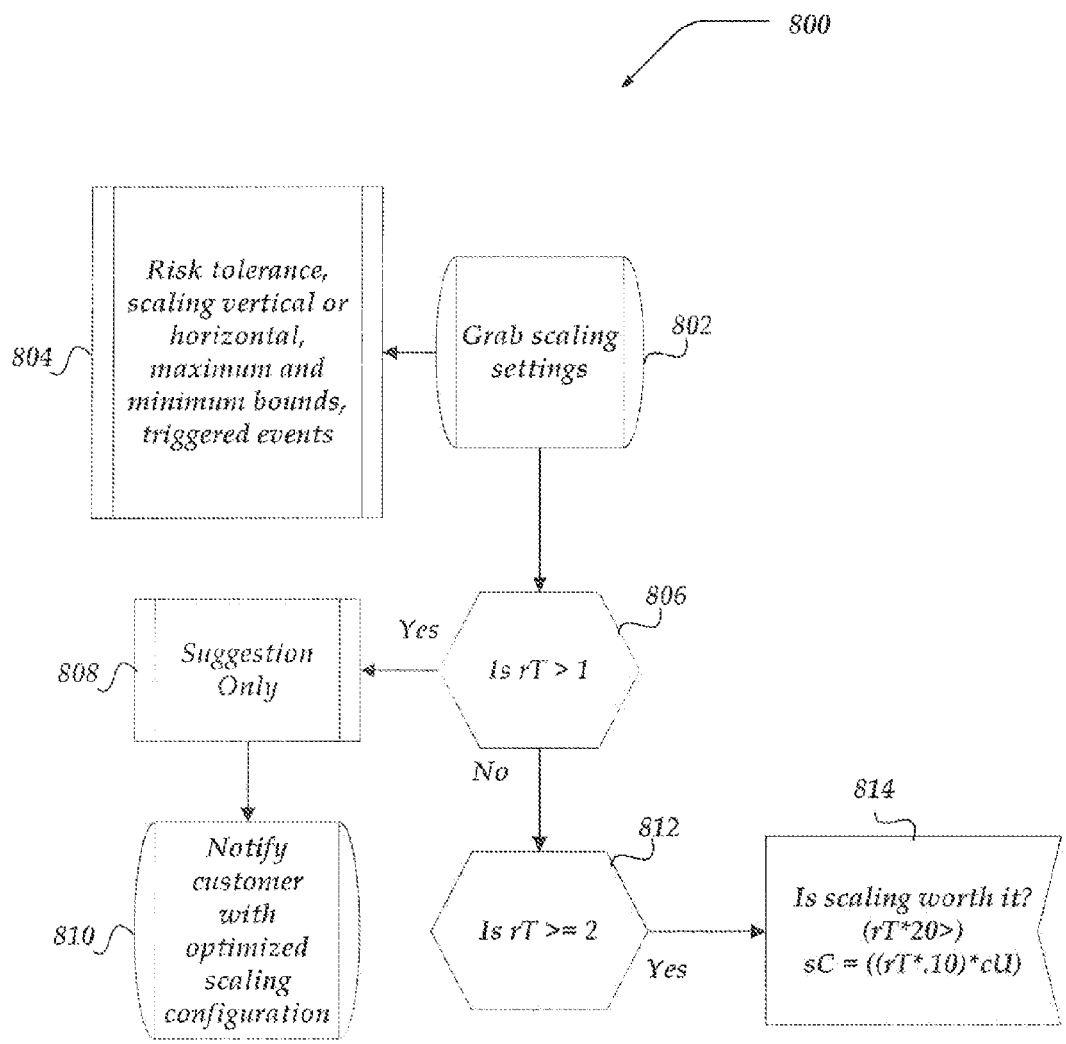
FIG. 8 shows an overview flowchart for a process for determining a scaling decision tree score in accordance with at least one of the various embodiments.

FIG. 8 shows an overview flowchart for process 800 for determining a scaling decision tree score in accordance with at least one of the various embodiments. In at least one of the various embodiments, after the performance characteristics and usage data has been gathered, current and predictive views created, and a prediction score calculated, a determination may be made based in part on user supplied criteria if sealing of computing resources may be required.

In at least one of the various embodiments, a process may use a scaling decision tree as part of determining whether sealing may be performed. At block 802, in at least one of the various embodiments, the current scaling setting for the computing service may be retrieved a process may make predictive scoring calculations as discussed above. At block 804, in at least one of the various embodiments, all relevant business rules, compared predicted scaling delta to maximum and minimum resource bounds, or the like, to determine if scaling may need to be considered.

At decision block 806, in at least one of the various embodiments, if it is determined that scaling of computing resources may be considered then if the risk threshold for the process is low (e.g., rT>1) the process may proceed to block 808.

At block 808, in at least one of the various embodiments, generating a suggestion for the user that scaling may be considered and may be advantageous for the computing service.

At block 810, in at least one of the various embodiments, the process may notify the customer of the new recommended scaling and computing resource configuration. In at least one of the various embodiments, a customer may be notified using one or more notification methods, such as, email, SMS, user-interface message display, or the like.

At decision block 812, in at least one of the various embodiments, if the risk threshold may be determined to high enough to proceed (e.g., rT>=2) the process may proceed to block 814.

At block 814, in at least one of the various embodiments, the scaling and subsequent risk and performance impact of the scaling operation may be analyzed to determine if scaling is cost effective given the amount of the scaling. In at least one of the various embodiments, a predictive scaling determination that indicates a small delta value leading to only a small change in allocation of computing resources may not be executed if it may be determined that it is not worth the collateral expense and risk of performing the scaling and computing resource provisioning.

Figure 9:
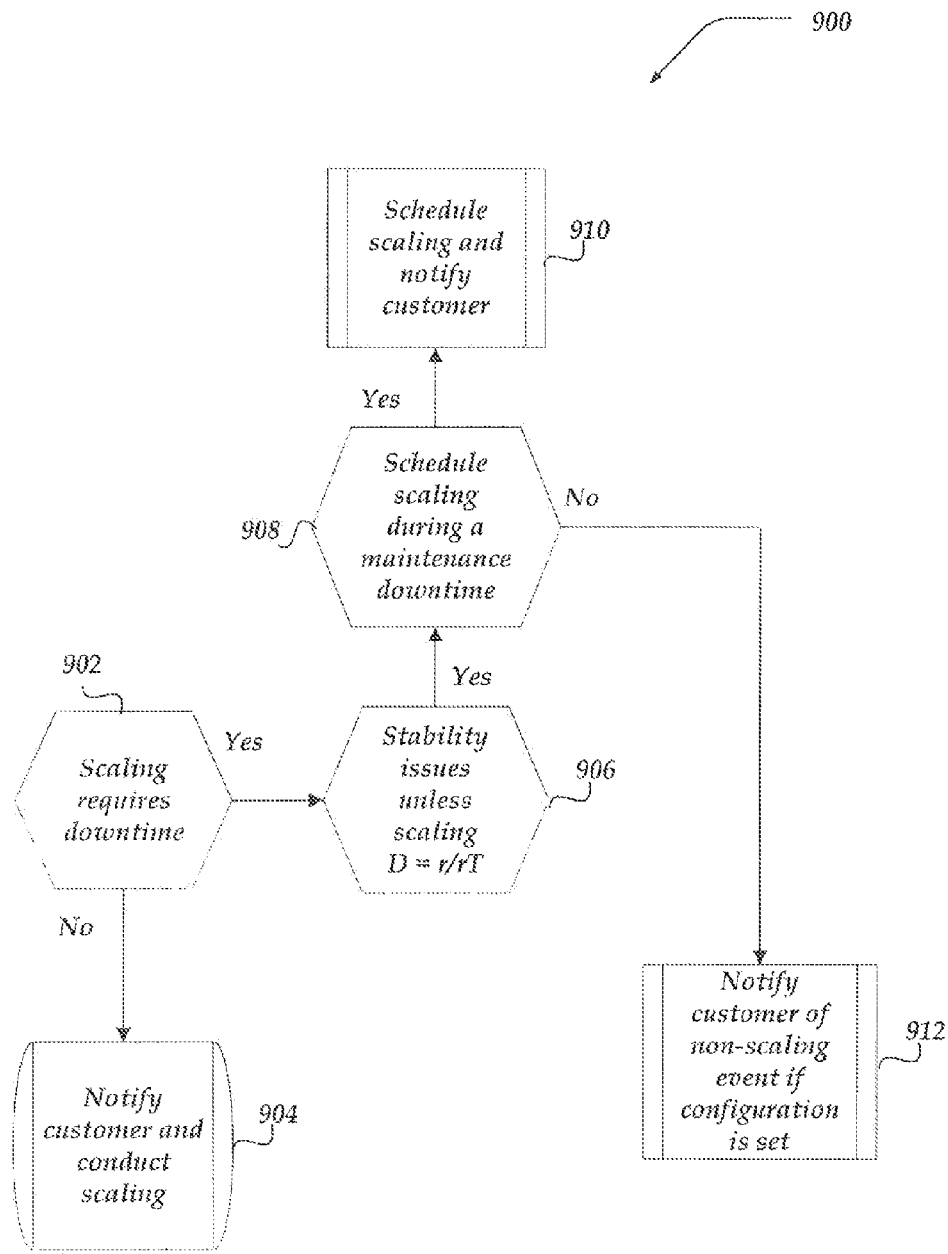
FIG. 9 shows an overview flowchart for a process for an auto-sealing change decision tree in accordance with at least one of the various embodiments.

FIG. 9 shows an overview flowchart for process 900 for an auto-scaling change decision tree in accordance with at least one of the various embodiments. In at least one of the various embodiments, a user's computing services may be configured to scale automatically.

At decision block 902, in at least one of the various embodiments, a determination may be made whether the scaling operation may require downtime to provision the required computing resources.

At block 904, in at least one of the various embodiments, if the downtime may be not required the predictive scaling application may notify the user that their computing services may be auto-sealed and the predictive scaling application may conduct the scaling.

In at least one of the various embodiments, the predictive scaling application may be arranged to wait a configured time period after notifying users of impending scaling operations to enable the user to intervene and review the impending scaling configuration before it happens. This delay may give the customer an opportunity to manually modify to scaling configuration or to cancel the planned scaling operation before it is performed.

At decision block 906, in at least one of the various embodiments, if scaling requires downtime a process may determine whether the hosted applications may experience stability issues unless scaling is performed.

At decision block 908, in at least one of the various embodiments, the predictive scaling implication may determine whether to schedule scaling during a future maintenance downtime period, if so control may move to block 910. Otherwise, in at least one of the various embodiments, control may move to block 912.

At block 910, in at least one of the various embodiments, the predictive scaling application may schedule the scaling to occur during an appropriate maintenance period and may notify the user that a sealing operation may be scheduled.

At block 912, in at least one of the various embodiments, the user may be notified that scaling may have been determined to be necessary for system stability but it may not have been executed.

In at least one of the various embodiments, sealing and computing resource provisioning may be determined to be necessary for system stability but user controlled configuration and/or policy based business rules may supersede auto-scaling. For example, in at least one of the various embodiments, this may occur if scaling to meet a usage demand would provision computing resources that exceed limits that may be defined by the user.

Figure 10:
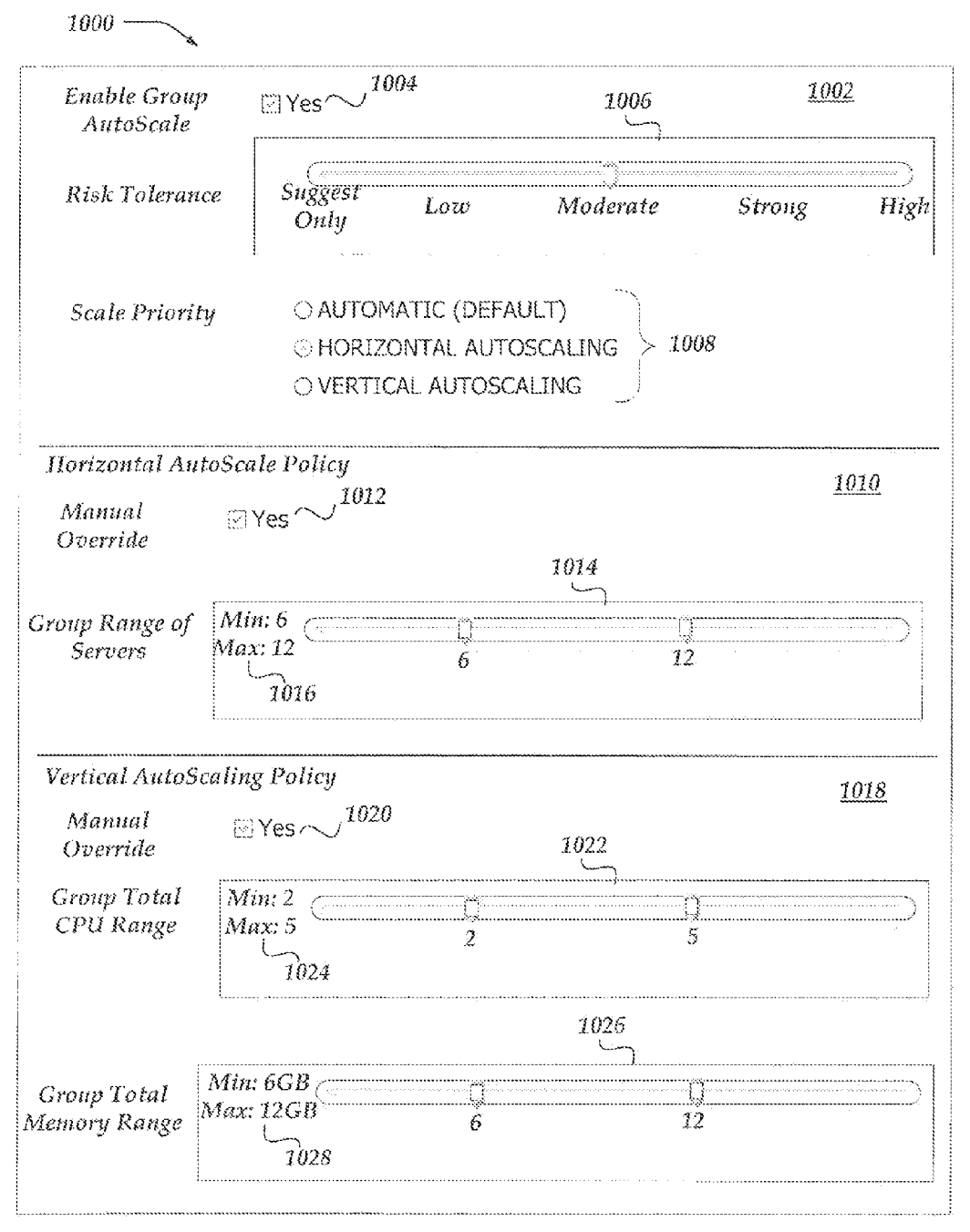

FIG. 10 shows a diagram of illustrative user-interface 1000 in accordance with at least one of the various embodiments.

In at least one of the various embodiments, user-interface 1000 may be arranged to enable users to configure parameters that may be relevant to predictive scaling and provisioning for their computing services. In at least one of the various embodiments, user-interface 1000 may be divided into regions.

User-interface region 1002, in at least one of the various embodiments, may include a variety of user-interface controls, such as, check box 1004 for enabling group auto-scaling, slide control 1006 for setting risk tolerance, radio button group 1008 for setting scaling priority, or the like.

User-interface region 1010, in at least one of the various embodiments, may include a variety of user-interface controls related to setting horizontal auto-scaling policy, such as, check box 1012 for enabling manual override, slider 1014 for setting scaling ranges for computing resource, labels 1016 that may report the current range setting for a computing resource, or the like.

User-interface region 1018, in at least one of the various embodiments, may include a variety of user-interface control for controlling vertical auto-sealing policy, such as, cheek box 1020 that may be for activating manual override, slider 1022 for setting CPU allocation ranges, labels 1024 for reporting the current CPU allocation range, slider 1026 for setting memory allocation ranges, labels 1028 for reporting the current memory allocation range, or the like. One of ordinary skill in the art may appreciate that a user interface to set parameters for auto-scaling may include controls and parameters other than those depicted in FIG. 10, or described herein.

Figure 11:
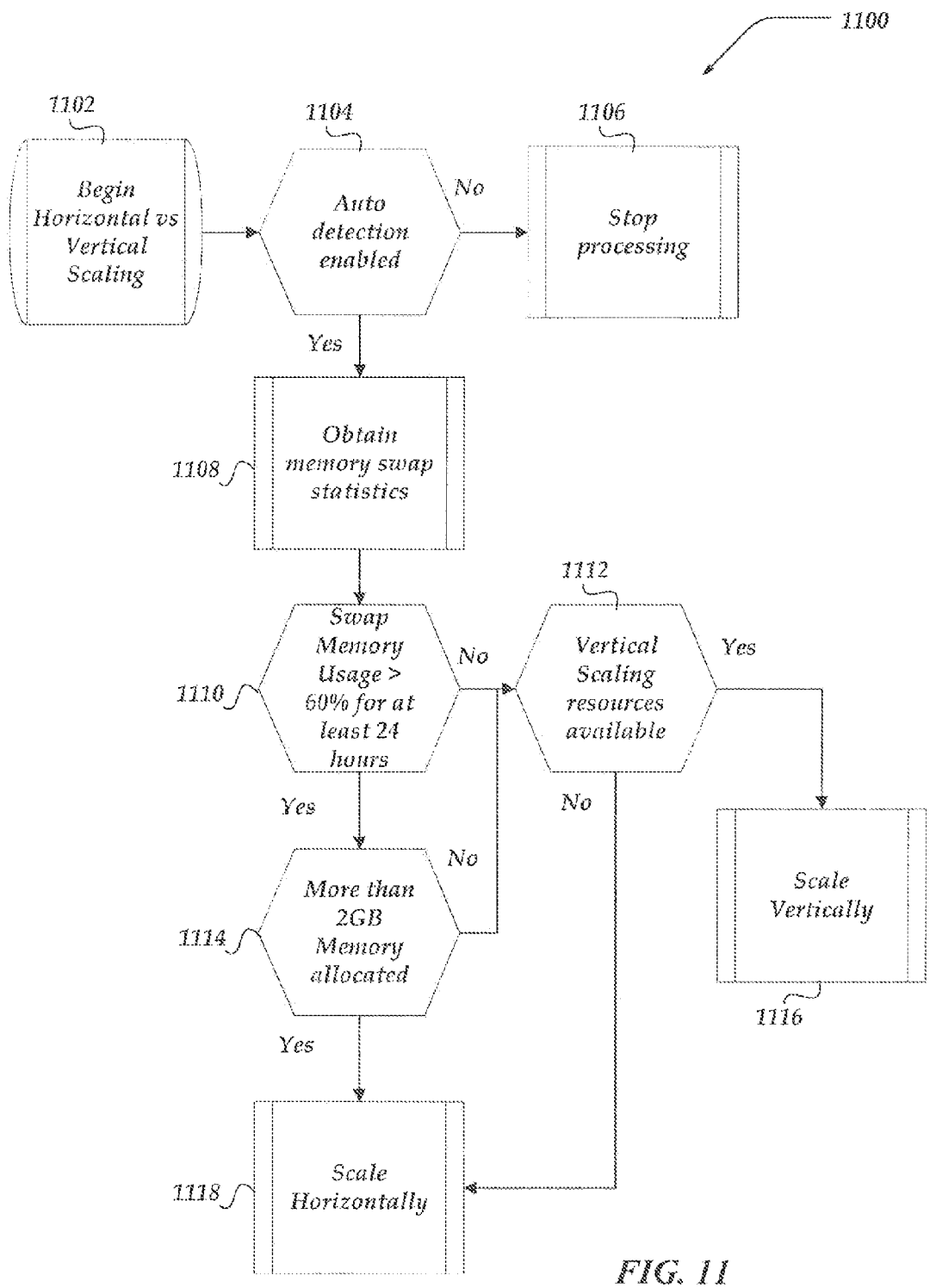
FIG. 11 shows an overview flowchart for a process for determining horizontal and vertical scaling in accordance with at least one of the various embodiments.

FIG. 11 shows an overview flowchart for process 1100 for determining horizontal and vertical scaling in accordance with at least one of the various embodiments. In at least one of the various embodiments, the scaling of computing resources horizontally or vertically may be at least determined in part by process 1100.

At block 1102, in at least one of the various embodiments, the predictive scaling application may begin determining how a computing service may be scaled. In at least one of the various embodiments, the determination may be between horizontal scaling and vertical seeding.

At decision block 1104, in at least one of the various embodiments, if auto detection may be enabled control may move to block 1108. Otherwise, in at least one of the various embodiments, control may move to block 1106 where control may be returned to a calling process.

In at least one of the various embodiments, a customer or an operator may have configured the process to require manual intervention to scale the computing resources horizontally or vertically. In at least one of the various embodiments, a warning may be raised in a user-interface and/or sent in a message using email, SMS, or the like, to the customer, operator, or other interested party, indicating that auto-detection of scaling may not be processed.

At block 1108, in at least one of the various embodiments, a process may obtain memory swap statistics. Memory swap statistics may be obtained from a variety of sources, including, but not limited to, hypervisor data feeds, advanced monitoring agents (e.g., SNMP, operation system event logs, Linux/proc pseudo-file system, or the like), agent based third-party monitoring (e.g., HP OpenView, IBM Tivoli), or the like.

At decision block 1110, in at least one of the various embodiments, a process may determine if swap memory usage may have exceeded 60% for at least 24 hours. If so, in at least one of the various embodiments, control may move to decision block 1114. Otherwise, in at least one of the various embodiments, control move to decision block 1112.

At decision block 1114, in at least one of the various embodiments, a process may test whether more than 2 GB of memory may already be allocated to the current computing service. If so, in at least one of the various embodiments, control may move to block 1118. Otherwise, in at least one of the various embodiments, control may move to decision block 1112.

At decision block 1112, in at least one of the various embodiments, if vertical scaling resources are not available, control may move to block 1118. Otherwise, in at least one of the various embodiments, control may move to block 1116.

In at least one of the various embodiments, in addition to lack of computing resources there may be other resources that may divert the predictive scaling application away from vertical scaling and to horizontal scaling may no longer be appropriate and may continue may initiate horizontal scaling for the examined computing application process.

At block 1118, in at least one of the various embodiments, horizontal scaling may be initiated.

One of ordinary skill in the art will recognize that the computing resource parameters, comparison tests, and subsequent actions taken described herein are illustrative examples. Other computing resources may be examined, such as, CPU utilization, disk access, disk latency, thread/process count, or the like. Further, other tests may be used to trigger scaling in addition to tests described herein.

Also, in at least one of the various embodiments, thresholds and triggers are not limited to those described herein. In at least one of the various embodiments, threshold and trigger values, such as, swap memory usage utilization, CPU utilization, or the like, may be determined based in part on user preference, administrative settings, or the like. Further, these and other values may be read in, from configuration files, receive through user interfaces, assigned by way of API's, set by business rules, or the like.

Figure 12:
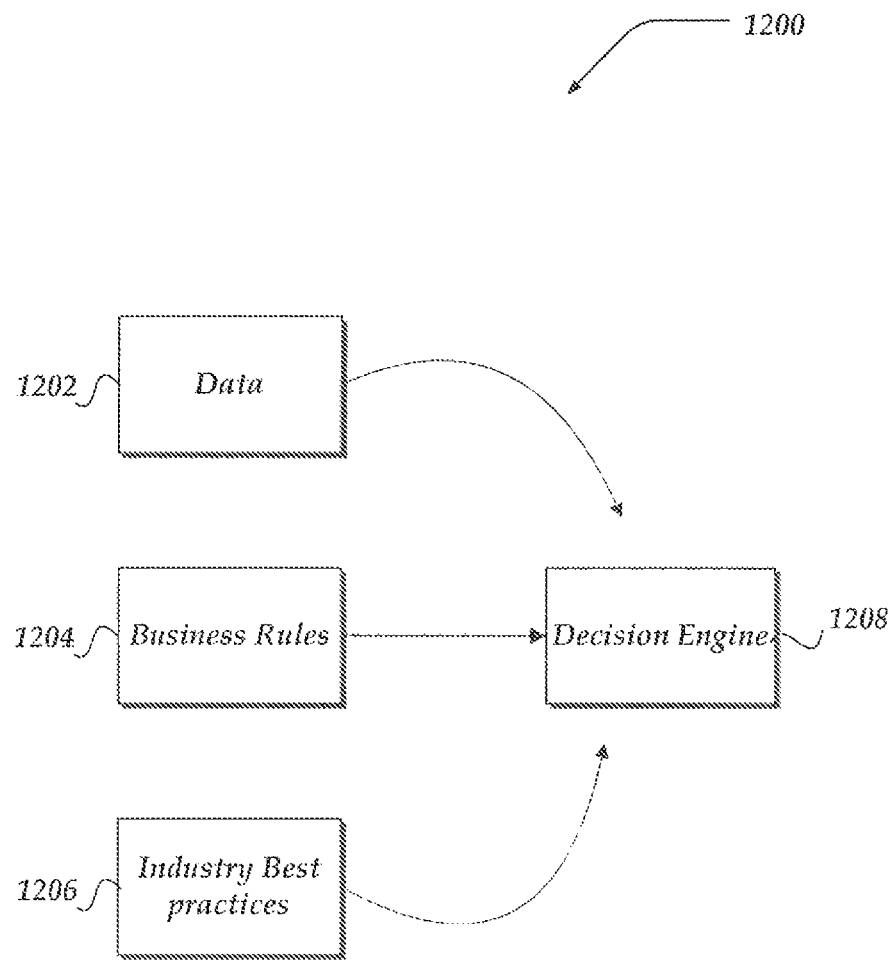
FIG. 12 shows an overview logical diagram of data sources for a predictive scaling application in accordance with at least one of the various embodiments.

FIG. 12 shows an overview logical diagram of data sources for predictive scaling application 1200 in accordance with at least one of the various embodiments. For at least one of the various embodiments, FIG. 12 depicts the data sources for a decision engine that may be enabled to determine how to arrange computing resources for improved performance of a computing infrastructure within a cloud-based environment. Further, in at least one of the various embodiments, a decision engine may be arranged to provide information to customers, operators, and administrators, to improve their understanding on how a computing infrastructure within a cloud based environment may be arranged.

In at least one of the various embodiments, collected data 1202, business rules 1204, and industry best practices 1206 may be interpreted by decision engine 1208 to determine changes to the computing resources that may result in improved performance for one or more computing services. In at least one of the various embodiments, decision engine 1208 may be arranged to determine at least predicative scaling, auto-scaling, and near term scaling.

In at least one of the various embodiments, near term scaling of computing resources may be based on the usage trends of computing resource parameters the infrastructure being examined. If, in at least one of the various embodiments, a quantifiable pattern (e.g., increasing or decreasing usage) is detected, near term scaling of computing resources may be employed.

Figure 13:
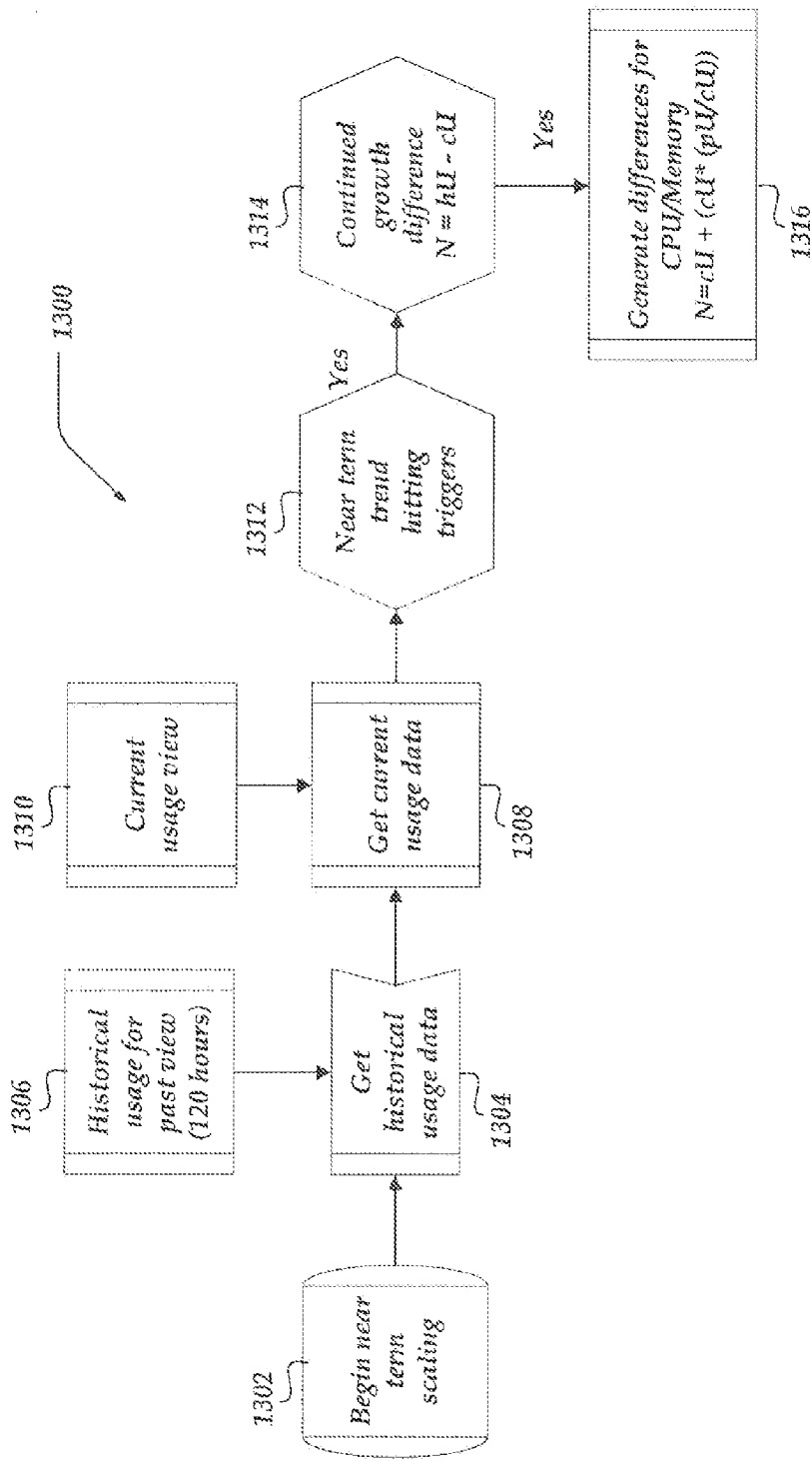
FIG. 13 shows an overview flowchart for a process for near term sealing in accordance with at least one of the various embodiments.

FIG. 13 shows an overview flowchart for process 1300 for near term scaling in accordance with at least one of the various embodiments.

At block 1302, in at least one of the various embodiments, the predictive scaling application may initiate near-term scaling.

At block 1304, in at least one of the various embodiments, historical usage data for computing resource parameters 1306, such as, CPU utilization, swap memory utilization, disk latency, disk usage, or the like. In at least one of the various embodiments, historical usage data may be retrieved from the historical data views discussed above.

At block 1308, in at least one of the various embodiments, a process may retrieve the current usage data of the computing resource parameters, such as, CPU utilization, swap memory utilization, disk latency, disk usage, or the like. In at least one of the various embodiments, current usage data may be retrieved from one or more current data views 1310.

At decision block 1312, in at least one of the various embodiments, once the relevant usage data has been retrieved a process may examine the data to determine if a near term trend is approaching one or more determined triggers or thresholds. In at least one of the various embodiments, threshold and trigger values, such as, swap memory usage utilization, CPU utilization, or the like, may be determined based in part on customer preference, operator preference, or the like. Further, these and other trigger and threshold values may be read in from configuration files, received through user-interfaces, assigned by way of API's, determined by business rules, or the like.

At decision block 1314 in at least one of the various embodiments, if a process detects usage trends that may be approaching determined triggers or thresholds, in at least one of the various embodiments, a process may test whether the current usage (cU) of the examined computing resource parameter may be continuing to grow relative to historical usage (hU) (e.g., N=hU−cU). In at least one of the various embodiments, if the current usage of a computing resource is continuing to grow relative to historical usage control may move to block 1316.

At block 1316, in at least one of the various embodiments, a process may generate predictive scaling values for the relevant computing resources and initiate the appropriate scaling behavior as discussed above.

Figure 14:
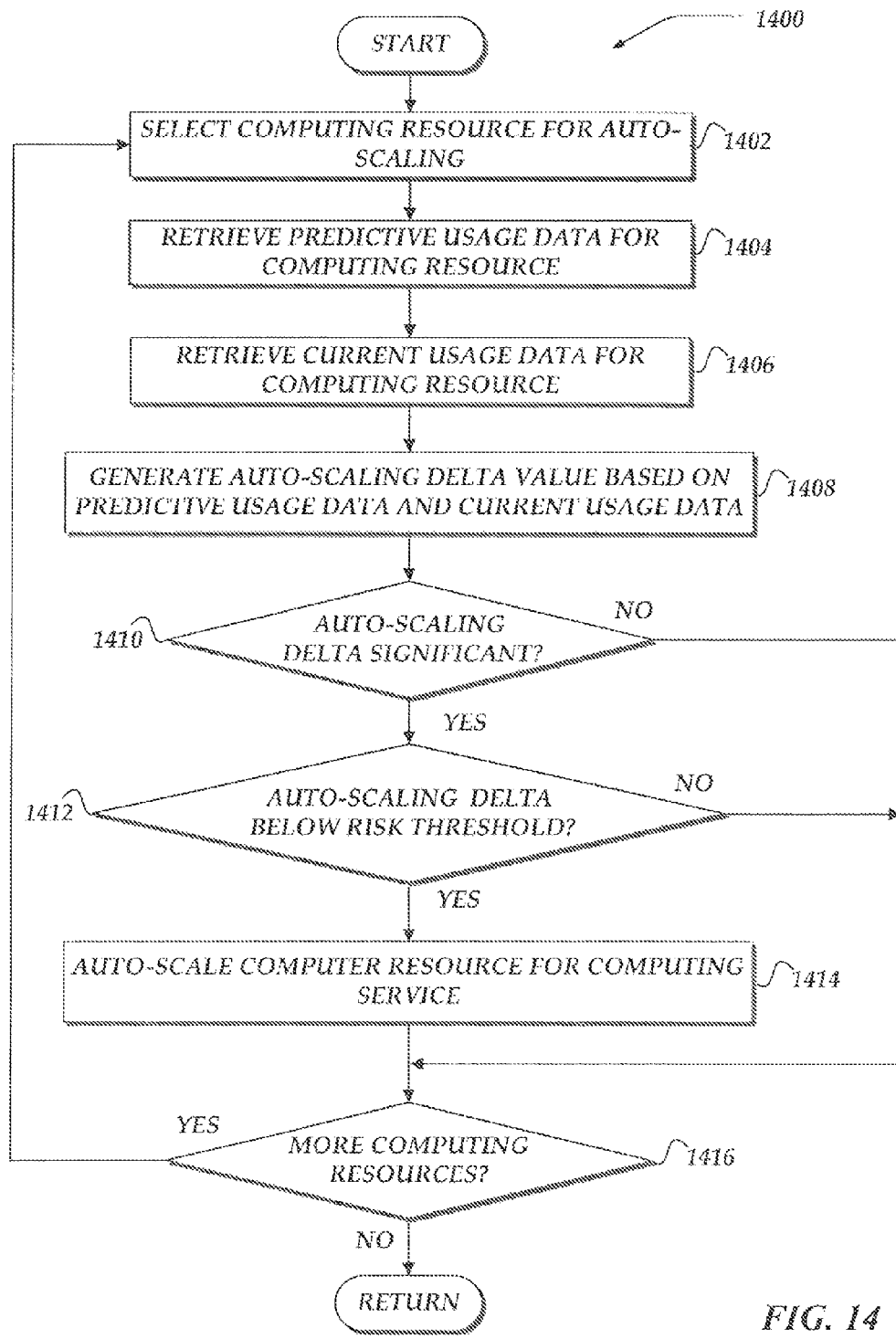
FIG. 14 shows an overview flowchart for a process for auto-sealing in accordance with at least one of the various embodiments.

FIG. 14 shows an overview flowchart for process 1400 for auto-scaling computing resources for as computing service in accordance with at least one of the various embodiments. In at least one of the various embodiments, one or more computing services may be selected for auto-scaling. In at least one of the various embodiments, the predicative scaling application may periodically visit each computing services that may be under management to determine if the computing services may be eligible for auto-sealing. Also, in at least one of the various embodiments, users may intervene and directly initiate auto-scaling operations for one or more computing services.

In at least one of the various embodiments, predefined business rules may establish threshold based on one or more metrics that if exceeded may make a computing service eligible for auto-scaling.

After a start block, at block 1402, in at least one of the various embodiments, one or more computing resources may be selected for auto-scaling. In at least one of the various embodiments, the predictive scaling application may apply predefined business rules to determine which computing resources for a given computing service may be eligible for auto-scaling.

In at least one of the various embodiments, selected computing resources may be comprised of one or more constituent computing resources. For example, in at least one of the various embodiments, a predictive scaling application may be enabled to define a computing resource such a "processing power" that is an amalgam of CPU access, high-speed memory cache, and memory. In this example, in at least one of the various embodiments, auto-scaling "processing power" may result in three constituent computing resources being auto-scaled.

In at least one of the various embodiments, some computing services may be configured to enable auto-scaling for a particular set of the available computer resources. For example, in at least one of the various embodiments, a computing service that may be sensitive to disk size changes may exclude a computing resource such as disk drive size quotas from the from being auto-scaled.

At block 1404, in at least one of the various embodiments, the predictive usage data for a computing resource may be retrieved. In at least one of the various embodiments, the predictive usage data may be retrieved from read-only views generated from one or more indexes.

In at least one of the various embodiments, these indexes may be generated from data and metrics relating to the operational history of the computing resources. For example, in at least one of the various embodiments, an index may include CPU utilization history for one or more computing services.

In at least one of the various embodiments, the views used to generating predictive usage data may be predictive models generated from historical usage data and interactions between the various measured usage metrics. From this data, decision tree generated by well-known stochastic techniques such as CHAID may be employed to determine predictive usage values.

In at least one of the various embodiments, interactions between the measured metrics may improve prediction values by taking into account how changes in the usage demand of one computing resource may predict non-obvious changes in the usage demand for other computing recourses. For example, in at least one of the various embodiments, an increase in the number of network connections may single that the disk storage demand may increase.

In some cases, in at least one of the various embodiments, the interactions between computing resource demands and/or the value of measured metrics may be different for each computing service. Thus, in at least one of the various embodiments, the historical usage data for each computing service may be compiled and indexed separately.

At block 1406, in at least one of the various embodiments, the current usage data for the computing resource may be retrieved. In at least one of the various embodiments, the current usage data for the computing resource may be retrieved from one or more indexes. In at least one of the various embodiments, the current usage data may be retrieved directly from the computing resource, computing services, a hypervisor managing the computing service, a host operating system, or the like.

At block 1408, in at least one of the various embodiments, the auto-scaling delta value may be determined based on the retrieved predictive usage data and the retrieved current usage data for the computing resource. In at least one of the various embodiments, the auto-scaling delta value may be a determined value that may represent a quantity of computing resources that may be allocated or de-allocation from the computing service.

At decision block 1410, in at least one of the various embodiments, if the auto-scaling delta is of a significant value control may move to decision block 1412. Otherwise, in at least one of the various embodiments, control may move to decision block 1416.

In at least one of the various embodiments, if the quantity of computing resources being provisioned and/or allocated to a computing service may be below a defined threshold the predictive scaling application may defer the completion the auto-scaling of the computer resource. This may be determined to be advantageous lithe scaling of the computer resources has the potential to disrupt the performance of the computing service. For example, in at least one of the various embodiments, if an allocation of computing resource would cause a computing, service to require a restart the allocation may be deferred unless the delta value is significant.

In at least one of the various embodiments, the threshold value for the delta value may be determined by predefined business rules, configuration settings, user input, or the like.

At decision block 1412, in at least one of the various embodiments, if the proposed auto-sealing is below the risk threshold of the computing service being scaled, control may move to block 1414. Otherwise, in at least one of the various embodiments, control may move to decision bock 1416.

At block 1414, in at least one of the various embodiments, the predictive scaling application may auto-scale the computing resource for the current computing service. In at least one of the various embodiments, the predictive scaling application may provision and allocate computing resources that correspond to the previously calculated delta value.

In at least one of the various embodiments, in the course of allocating the determined quantity of computer resources, the predictive scaling application may take actions based on predefined business rules that may be associated with the computing services that may be affected by the computing resources allocation. For example, in at least one of the various embodiments, a particular computing service may have an associated predefined business rule that triggers an operating system reboot if the allocation for a particular computing resource is modified.

Also, in at least one of the various embodiments, predefined business rules associated with a computing service may enable the time of day that a particular computing resource allocation may be adjusted. For example, in at least one of the various embodiments, if the predictive sealing application determines that additional virtual machine instances are needed as predefined business rule may delay the allocation of those instances to a particular time of day.

Further, in at least one of the various embodiments, other factors and/or metrics may be used in predefined business rules to control if an auto-scaling of a computing resource may run to completion. Generally, in at least one of the various embodiments, the predefined business rules may include conditions that relate specifically to the internal operational characteristics of the computing service at hand. These may be application specific considerations that may not appear in the available recorded and indexed metrics and thus may not be readily discernible by the predictive scaling application.

In at least one of the various embodiments, one or more predefined business rules may include programming code (e.g., API calls, messaging calls, or the like) for interrogating the computing service to test a condition. Then based on the result of the test, the rule may or may not complete the allocation of the computing resources.

At decision block 1416, in at least one of the various embodiments, if there may be more computing resources to auto-scale for the selected computing service, control may loop back to block 1402. Otherwise, in at least one of the various embodiments, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non transitive storage media, or the like.

What is claimed as new and desired to be protected by Letters Patent of the United States is:

1. A method for scaling a plurality of computing resources for a plurality of network devices over a network, wherein at least one network device is operative to perform actions, comprising:

generating predictive usage data and current usage data for at least one computing service, wherein the predictive usage data and current usage data is based on operational data from at least a portion of the plurality of network devices;

selecting at least one computing resource for scaling based on at least one business rule associated with the at least one computing service;

generating an prediction score based on new predictive usage data, the current usage data, the predicted usage data, and historical usage data for the at least one computing resource; and when a user supplied criteria indicates that a scaling operation is required, performing further actions, including:

generating at least one auto-scaling delta for the at least one computing resource based on at least a portion of the predictive usage data, and at least a portion of the current usage data;

when a magnitude of the at least one auto-scaling delta exceeds a first threshold to the predictive usage data and the current usage data, automatically scaling an allocation of the at least one computing resource for the at least one computing service based at least in part on the at least one auto-scaling delta even if the allocation requires a restart of the at least one computer resource; and when the magnitude is less than a second threshold and scaling the allocation requires the restart of the at least one computer resource, delaying the automatic scaling until the restart of the at least one computer resource is a non-requirement for scaling the allocation; and executing one or more actions based on one or more predefined business rules that are associated with the at least one computing service that is affected by the allocation of the at least one computing resource.

2. The method of claim 1, further comprising:

generating at least one risk tolerance value for the at least one computing service based at least on a third threshold and the at least one scaling value; and when the at least one risk tolerance value exceeds the third threshold and the at least one scaling value exceeds the second threshold, automatically scaling the at least one computing resource.

3. The method of claim 1, further comprising when a magnitude of at least one determined usage value for the at least one computing resource exceeds a third threshold, perform further actions including:

when at least one current allocation of the at least one computing resource exceeds the third threshold, horizontally scaling the at least one computing resource; and when the at least one current allocation of the at least one computing resource is below the third threshold, vertically scaling the at least one computing resource.

4. The method of claim 1, further comprising, when scaling the at least one computing service requires the at least one computing service to operate in a maintenance mode, scheduling the scaling during at least one period of time to perform maintenance for the at least one computing service.

5. The method of claim 1, further comprising, when the second threshold is exceeded, notifying an owner of the at least one computing service of at least one optimal scaling allocation.

6. The method of claim 1, wherein the operational data further comprises, an aggregation of the operational data into a plurality of views, wherein each view corresponds to at least one predefined time range.

7. The method of claim 1, further comprising, receiving the operational data from at least one hypervisor.

8. A network device that is operative for scaling a plurality of computing resources for a plurality of network devices over a network comprising:
   a transceiver that is operative to communicate over a network;
   a memory that is operative to store at least instructions; and
   a processor device that is operative to execute instructions that enable actions, including:
      generating predictive usage data and current usage data for at least one computing service, wherein the predictive usage data and current usage data is based on operational data from at least a portion of the plurality of network devices;
      selecting at least one computing resource for scaling based on at least one business rule associated with the at least one computing service;
      generating a prediction score based on new predictive usage data, the current usage data, the predicted usage data, and historical usage data for the at least one computing resource; and
      when a user supplied criteria indicates that a scaling operation is required, performing further actions, including:
         generating at least one auto-scaling delta for the at least one computing resource based on at least a portion of the predictive usage data, and at least a portion of the current usage data;
         when a magnitude of the at least one auto-scaling delta exceeds a first threshold to the predictive usage data and the current usage data, automatically scaling an allocation of the at least one computing resource for the at least one computing service based at least in part on the at least one auto-scaling delta even if the allocation requires a restart of the at least one computer resource; and
         when the magnitude is less than a second threshold and scaling the allocation requires the restart of the at least one computer resource, delaying the automatic scaling until the restart of the at least one computer resource is a non-requirement for scaling the allocation; and
      executing one or more actions based on one or more predefined business rules that are associated with the at least one computing service that is affected by the allocation of the at least one computing resource.

9. The network device of claim 8, further comprising:
   generating at least one risk tolerance value for the at least one computing service based at least on a third threshold and the at least one scaling value; and
   when the at least one risk tolerance value exceeds the second threshold and the at least one scaling value exceeds the second threshold, automatically scaling the at least one computing resource.

10. The network device of claim 8, further comprising when a magnitude of at least one determined usage value for the at least one computing resource exceeds a third threshold, perform further actions including:
   when at least one current allocation of the at least one computing resource exceeds the third threshold, horizontally scaling the at least one computing resource; and
   when the at least one current allocation of the at least one computing resource is below the third threshold, vertically scaling the at least one computing resource.

11. The network device of claim 8, further comprising, when scaling the at least one computing service requires the at least one computing service to operate in a maintenance mode, scheduling the scaling during at least one period of time to perform maintenance for the at least one computing service.

12. The network device of claim 8, further comprising, when the second threshold is exceeded, notifying an owner of the at least one computing service of at least one optimal scaling allocation.

13. The network device of claim 8, wherein the operational data further comprises, an aggregation of the operational data into a plurality of views, wherein each view corresponds to at least one predefined time range.

14. The network device of claim 8, further comprising, receiving the operational data from at least one hypervisor.

15. A processor readable non-transitory storage media that includes instructions for scaling a plurality of computing resources for a plurality of network devices over a network, wherein execution of the instructions by a processor device enables actions, comprising:
   generating predictive usage data and current usage data for at least one computing service, wherein the predictive usage data and current usage data is based on operational data from at least a portion of the plurality of network devices;
   selecting at least one computing resource for scaling based on at least one business rule associated with the at least one computing service;
   generating a prediction score based on new predictive usage data, the current usage data, the predicted usage data, and historical usage data for the at least one computing resource; and
   when a user supplied criteria indicates that a scaling operation is required, performing further actions, including:
      generating at least one auto-scaling delta for the at least one computing resource based on at least a portion of the predictive usage data, and at least a portion of the current usage data;
      when a magnitude of the at least one auto-scaling delta exceeds a first threshold to the predictive usage data and the current usage data, automatically scaling an allocation of the at least one computing resource for the at least one computing service based at least in part on the at least one auto-scaling delta even if the allocation requires a restart of the at least one computer resource; and
      when the magnitude is less than a second threshold and scaling the allocation requires the restart of the at least one computer resource, delaying the automatic scaling until the restart of the at least one computer resource is a non-requirement for scaling the allocation; and
   executing one or more actions based on one or more predefined business rules that are associated with the at least one computing service that is affected by the allocation of the at least one computing resource.

16. The media of claim 15, further comprising:
   generating at least one risk tolerance value for the at least one computing service based at least on a third threshold and the at least one scaling value; and when the at least one risk tolerance value exceeds the third threshold and the at least one scaling value exceeds the second threshold, automatically scaling the at least one computing resource.

17. The media of claim 15, further comprising when a magnitude of at least one determined usage value for the at least one computing resource exceeds a third threshold, perform further actions including:
when at least one current allocation of the at least one computing resource exceeds the third threshold, horizontally scaling the at least one computing resource; and
when the at least one current allocation of the at least one computing resource is below the third threshold, vertically scaling the at least one computing resource.

18. The media of claim 15, further comprising, when scaling the at least one computing service requires the at least one computing service to operate in a maintenance mode, scheduling the scaling during at least one period of time to perform maintenance for the at least one computing service.

19. The media of claim 15, further comprising, when the second threshold is exceeded, notifying an owner of the at least one computing service of at least one optimal scaling allocation.

20. The media of claim 15, wherein the operational data further comprises, an aggregation of the operational data into a plurality of views, wherein each view corresponds to at least one predefined time range.

21. The media of claim 15, further comprising, receiving the operational data from at least one hypervisor.

* * * * *